US010203538B2

(12) United States Patent
Teng et al.

(10) Patent No.: US 10,203,538 B2
(45) Date of Patent: Feb. 12, 2019

(54) TOUCH SUBSTRATE, TOUCH DISPLAY PANEL AND DISPLAY APPARATUS HAVING THE SAME, AND FABRICATING METHOD THEREOF

(71) Applicant: BOE TECHNOLOGY GROUP CO., LTD., Beijing (CN)

(72) Inventors: Wanpeng Teng, Beijing (CN); Xiangxiang Zou, Beijing (CN); Xuefei Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 32 days.

(21) Appl. No.: 15/531,146

(22) PCT Filed: Nov. 8, 2016

(86) PCT No.: PCT/CN2016/105067
§ 371 (c)(1),
(2) Date: May 26, 2017

(87) PCT Pub. No.: WO2017/177670
PCT Pub. Date: Oct. 19, 2017

(65) Prior Publication Data
US 2018/0188582 A1    Jul. 5, 2018

(30) Foreign Application Priority Data

Apr. 13, 2016  (CN) .......................... 2016 1 0228807

(51) Int. Cl.
*G02F 1/1335*  (2006.01)
*G02F 1/1333*  (2006.01)
(Continued)

(52) U.S. Cl.
CPC ........ *G02F 1/13338* (2013.01); *G02F 1/1333* (2013.01); *G02F 1/1335* (2013.01);
(Continued)

(58) Field of Classification Search
CPC .......... G02F 1/13338; G02F 1/133512; G02F 1/1343; G02F 1/1335; G02F 1/1333;
(Continued)

(56) References Cited

U.S. PATENT DOCUMENTS

2012/0075218 A1   3/2012  Lin et al.
2013/0021544 A1*  1/2013  Fukuyama .......... G02F 1/13338
                                                       349/12

(Continued)

FOREIGN PATENT DOCUMENTS

CN        101819343 A        9/2010
CN        103033979 A        4/2013
(Continued)

OTHER PUBLICATIONS

International Search Report & Written Opinion dated Feb. 6, 2017 regarding PCT/CN2016/105067.
First Office Action in the Chinese Patent Application No. 201610228807.X, dated Jun. 1, 2018; English translation attached.

*Primary Examiner* — Amit Chatly
(74) *Attorney, Agent, or Firm* — Intellectual Valley Law, P.C.

(57) ABSTRACT

The present application discloses a touch substrate including a base substrate; a touch electrode layer on a base substrate comprising a plurality of columns of first touch electrodes, a plurality of rows of second touch electrodes, and a plurality of columns of electrode bridges in a same layer and made of a same electrode material; and a black matrix layer on the base substrate. The plurality of columns of first touch electrodes are insulated from the plurality of rows of second touch electrodes, and cross over the plurality of rows of second touch electrodes forming a plurality of intersections. A plurality of first touch electrode in each column are electrically connected by a plurality of electrode bridges. A
(Continued)

plurality of second touch electrode in each row are electrically connected by the black matrix layer.

16 Claims, 10 Drawing Sheets

(51) Int. Cl.
*G02F 1/1343* (2006.01)
*G06F 3/041* (2006.01)
*G06F 3/044* (2006.01)

(52) U.S. Cl.
CPC ...... *G02F 1/1343* (2013.01); *G02F 1/133512* (2013.01); *G06F 3/044* (2013.01); *G06F 3/0412* (2013.01); *G06F 2203/04103* (2013.01); *G06F 2203/04111* (2013.01); *G06F 2203/04112* (2013.01)

(58) Field of Classification Search
CPC .................. G06F 3/0412; G06F 3/044; G06F 2203/04103; G06F 2203/04112; G06F 2203/04111
See application file for complete search history.

(56) References Cited

U.S. PATENT DOCUMENTS

| | | | |
|---|---|---|---|
| 2014/0160377 A1 | 6/2014 | Yamagishi et al. | |
| 2016/0011688 A1* | 1/2016 | Wang | G06F 3/044 345/174 |
| 2016/0188070 A1* | 6/2016 | Ko | G02F 1/13338 29/846 |
| 2016/0357278 A1 | 12/2016 | Qu et al. | |

FOREIGN PATENT DOCUMENTS

| | | | | |
|---|---|---|---|---|
| CN | 103197463 A | 7/2013 | | |
| CN | 203117609 U | 8/2013 | | |
| CN | 103744556 A | 4/2014 | | |
| CN | 103823601 A | 5/2014 | | |
| CN | 103941447 A | 7/2014 | | |
| CN | 104461182 A | 3/2015 | | |
| CN | 104635372 A | 5/2015 | | |
| JP | 2014229136 A | 10/2014 | | |
| JP | 2015056068 A | 3/2015 | | |
| WO | WO 2014153855 A1 * | 10/2014 | ......... | G02F 1/13338 |
| WO | WO 2015117288 A1 * | 8/2015 | ............. | G06F 3/044 |

* cited by examiner

FIG. 7B

Forming a touch electrode layer on a base substrate, the step of forming the touch electrode layer including forming a plurality of columns of first touch electrodes, a plurality of rows of second touch electrodes, and a plurality of columns of electrode bridges in a same layer using a same electrode material;

wherein the plurality of columns of first touch electrodes are formed to be insulated from the plurality of rows of second touch electrodes, and cross over the plurality of rows of second touch electrodes forming a plurality of intersections;
two adjacent first touch electrodes along a column direction are formed to be electrically connected at each intersection through an electrode bridge; and
second touch electrodes in each row are formed to be spaced apart from each other along a row direction.

↓

Forming a black matrix layer on a side of the touch electrode layer distal to the base substrate, the black matrix layer is formed so that two adjacent second touch electrodes along the row direction are formed to be electrically connected at each intersection through the black matrix layer.

FIG. 8

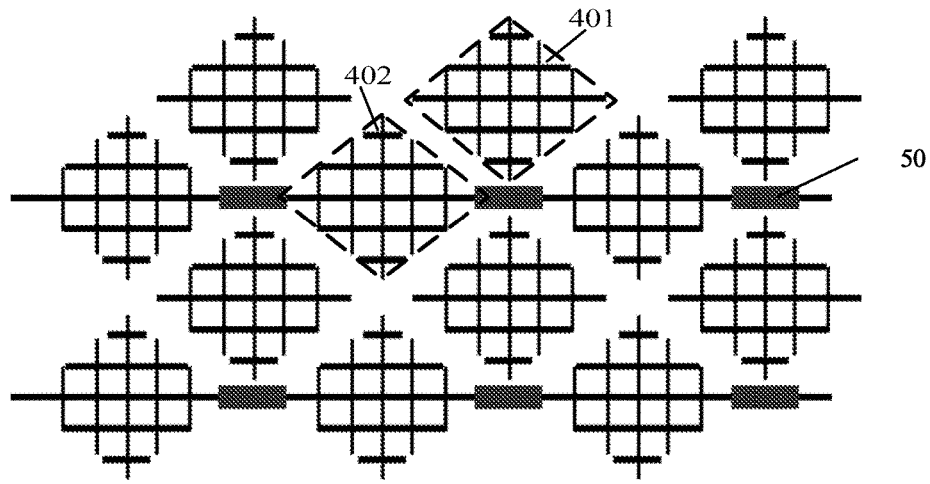

TOUCH SUBSTRATE, TOUCH DISPLAY PANEL AND DISPLAY APPARATUS HAVING THE SAME, AND FABRICATING METHOD THEREOF

CROSS-REFERENCE TO RELATED APPLICATION

This application is a national stage application under 35 U.S.C. § 371 of International Application No. PCT/CN2016/105067 filed Nov. 8, 2016, which claims priority to Chinese Patent Application No. 201610228807.X, filed Apr. 13, 2016, the contents of which are incorporated by reference in the entirety.

TECHNICAL FIELD

The present invention relates to display technology, more particularly, to a touch substrate, a touch display panel and a display apparatus having the same, and a fabricating method.

BACKGROUND

Touch display panels have found a wide range of applications in the display field. Touch display panels can be categorized into three classes: add-on mode touch panels, on-cell touch panels, and in-cell touch panels. The add-on mode touch panels may be fabricated separated from the display panels (e.g., a liquid crystal display panel), and may be adhered onto the display panels. The on-cell touch panels have the disadvantages of high manufacturing costs, low light transmission rate, and being relatively thick. The in-cell touch control technology integrates the touch sensor within the display unit. Thus, the thickness of the display panel and the manufacturing costs may be greatly reduced.

SUMMARY

In one aspect, the present invention provides a touch substrate comprising a base substrate; a touch electrode layer on a base substrate comprising a plurality of columns of first touch electrodes, a plurality of rows of second touch electrodes, and a plurality of columns of electrode bridges in a same layer and made of a same electrode material; and a black matrix layer on the base substrate; wherein the plurality of columns of first touch electrodes are insulated from the plurality of rows of second touch electrodes, and cross over the plurality of rows of second touch electrodes forming a plurality of intersections; a plurality of first touch electrode in each column are electrically connected by a plurality of electrode bridges; and a plurality of second touch electrode in each row are electrically connected by the black matrix layer.

Optionally, the black matrix layer comprises a plurality of columns of first black matrix blocks, a plurality of rows of second black matrix blocks, and a plurality of rows of black matrix bridges in a same layer and made of a same black matrix material; two adjacent second black matrix blocks along the row direction are electrically connected at each intersection through a black matrix bridge; two adjacent first black matrix blocks along the column direction are insulated from each other at each intersection; the plurality of columns of first black matrix blocks are insulated from the plurality of rows of second black matrix blocks; and two adjacent second touch electrodes along the row direction are electrically connected at each intersection through a black matrix bridge.

Optionally, first touch electrodes and electrode bridges in each column are of an integral structure; and second black matrix blocks and black matrix bridges in each row are of an integral structure.

Optionally, the touch substrate further comprises a first color filter layer; wherein the plurality of columns of first touch electrodes are insulated from the plurality of rows of second touch electrodes at the plurality of intersections by the first color filter layer.

Optionally, the first color filter layer comprising a plurality of first color filter blocks corresponding to a plurality of subpixel of first color; and a plurality of first color filter islands corresponding to the plurality of intersections; the plurality of first color filter blocks and the plurality of first color filter islands are in a same layer and made of a same insulating color filter material; and an electrode bridge and a black matrix bridge at each intersection are insulated by a corresponding first color filter island.

Optionally, the touch substrate further comprises a second color filter layer comprising a plurality of second color filter blocks corresponding to a plurality of subpixel of second color; and a plurality of second color filter islands corresponding to the plurality of intersections; wherein the plurality of second color filter blocks and the plurality of second color filter islands are in a same layer and made of a same insulating color filter material.

Optionally, a laminated structure comprising a first color filter island and a second color filter island at each intersection is sandwiched by an electrode bridge and a black matrix bridge; the electrode bridge and the black matrix bridge each intersection are insulated by the laminated structure.

Optionally, an electrode bridge at each intersection is sandwiched by a first color filter island and a second color filter island.

Optionally, the touch substrate further comprises a third color filter layer comprising a plurality of third color filter blocks corresponding to a plurality of subpixel of third color; and a plurality of third color filter islands corresponding to the plurality of intersections; wherein the plurality of third color filter blocks and the plurality of third color filter islands are in a same layer and made of a same insulating color filter material.

Optionally, a laminated structure comprising a first color filter island, a second color filter island, and a third color filter island at each intersection is sandwiched by an electrode bridge and a black matrix bridge; the electrode bridge and the black matrix bridge at each intersection are insulated by the laminated structure.

Optionally, an electrode bridge at each intersection is sandwiched by a first color filter island and a laminated structure comprising a second color fiber island and a third color filter island.

Optionally, the black matrix layer is made of a conductive black metal, a conductive black metal oxide, or a conductive metal with a blackened surface.

Optionally, the touch electrode layer is on a side of the black matrix layer distal to the base substrate.

Optionally, the black matrix layer is on a side of the touch electrode layer distal to the base substrate.

In another aspect, the present invention provides a method of fabricating a touch substrate, comprising forming a touch electrode layer on a base substrate, the step of forming the touch electrode layer comprising forming a plurality of columns of first touch electrodes, a plurality of rows of second touch electrodes, and a plurality of columns of electrode bridges in a same layer using a same electrode material; and forming a black matrix layer on the base substrate; wherein the plurality of columns of first touch electrodes are formed to be insulated from the plurality of rows of second touch electrodes, and cross over the plurality of rows of second touch electrodes forming a plurality of intersections; a plurality of first touch electrode in each column are formed to be electrically connected by a plurality of electrode bridges; and a plurality of second touch electrode in each row are formed to be electrically connected by the black matrix layer.

Optionally, the step of forming the black matrix layer comprises forming a plurality of columns of first black matrix blocks, a plurality of rows of second black matrix blocks, and a plurality of rows of black matrix bridges in a same layer using a same black matrix material; wherein two adjacent second black matrix blocks along the row direction are formed to be electrically connected at each intersection through a black matrix bridge; two adjacent first black matrix blocks along the column direction are formed to be insulated from each other at each intersection; the plurality of columns of first black matrix blocks are formed to be insulated from the plurality of rows of second black matrix blocks; and two adjacent second touch electrodes along the row direction are formed to be electrically connected at each intersection through a black matrix bridge.

Optionally, the method further comprises forming a first color filter layer; wherein the first color filter layer is formed so that the plurality of columns of first touch electrodes are insulated from the plurality of rows of second touch electrodes at the plurality of intersections by the first color filter layer.

Optionally, the step of forming the first color filter layer comprises forming a plurality of first color filter blocks corresponding to a plurality of subpixel of first color; and forming a plurality of first color filter islands corresponding to the plurality of intersections; wherein the plurality of first color filter blocks and the plurality of first color filter islands are formed in a same layer using a same electrode material; and the plurality of first color filter islands are formed so that a first touch electrode and a second touch electrodes at each intersection are insulated by a corresponding first color filter island.

Optionally, the method further comprises forming a second color filter layer; wherein the step of forming the second color filter layer comprises forming a plurality of second color filter blocks corresponding to a plurality of subpixel of second color; and forming a plurality of second color filter islands corresponding to the plurality of intersections; the plurality of second color filter blocks and the plurality of second color filter islands are formed in a same layer using a same electrode material.

Optionally, the step of forming the first color filter and the step of forming the second color filter are performed so that a first color filter island and a second color filter island at each intersection form a laminated structure; the laminated structure at each intersection is formed to be sandwiched by an electrode bridge and a black matrix bridge; the electrode bridge and the black matrix bridge at each intersection are insulated by the laminated structure.

Optionally, the step of forming the first color filter and the step of forming the second color filter are performed so that an electrode bridge at each intersection is sandwiched by a first color filter island and a second color filter island.

Optionally, the method further comprises a third color filter layer; wherein the step of forming the third color filler layer comprises forming a plurality of third color filter blocks corresponding to a plurality of subpixel of third color; and forming a plurality of third color filter islands corresponding to the plurality of intersections; the plurality of third color filter blocks and the plurality of third color filter islands are formed in a same layer using a same electrode material.

Optionally, the step of forming the first color filter, the step of forming the second color filter, and the step of forming the third color filter are performed so that a first color filter island, a second color filter island, and a third color filter island at each intersection form a laminated structure; the laminated structure at each intersection is formed to be sandwiched by an electrode bridge and a black matrix bridge; the electrode bridge and the black matrix bridge at each intersection are insulated by the laminated structure.

Optionally, the step of forming the first color filter, the step of forming the second color filter, and the step of forming the third color filter are performed so that an electrode bridge at each intersection is sandwiched by a first color filter island and a laminated structure comprising a second color filter island and a third color filter island.

In another aspect, the present invention provides a touch display panel comprising a touch substrate described herein or fabricated by a method described herein and an array substrate facing the touch substrate.

In another aspect, the present invention provides a touch display panel comprising a touch substrate described herein or fabricated by a method described herein and an array substrate facing the touch substrate, wherein the plurality of second color filter islands are in contact with the array substrate and configured to maintain a spacing between the touch substrate and the array substrate.

In another aspect, the present invention provides a touch display panel comprising a touch substrate described herein or fabricated by a method described herein and an array substrate facing the touch substrate, wherein a plurality of laminated structures are in contact with the array substrate and configured to maintain a spacing between the touch substrate and the array substrate, each of the plurality of laminated structures comprises a second color filter island and a third color filter island at each intersection.

BRIEF DESCRIPTION OF THE FIGURES

The following drawings are merely examples for illustrative purposes according to various disclosed embodiments and are not intended to limit the scope of the present invention.

FIG. 7B is a flow chart illustrating a method of fabricating a touch substrate in some embodiments according to the present disclosure.

FIG. 8 is a diagram illustrating the structure of a touch substrate in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
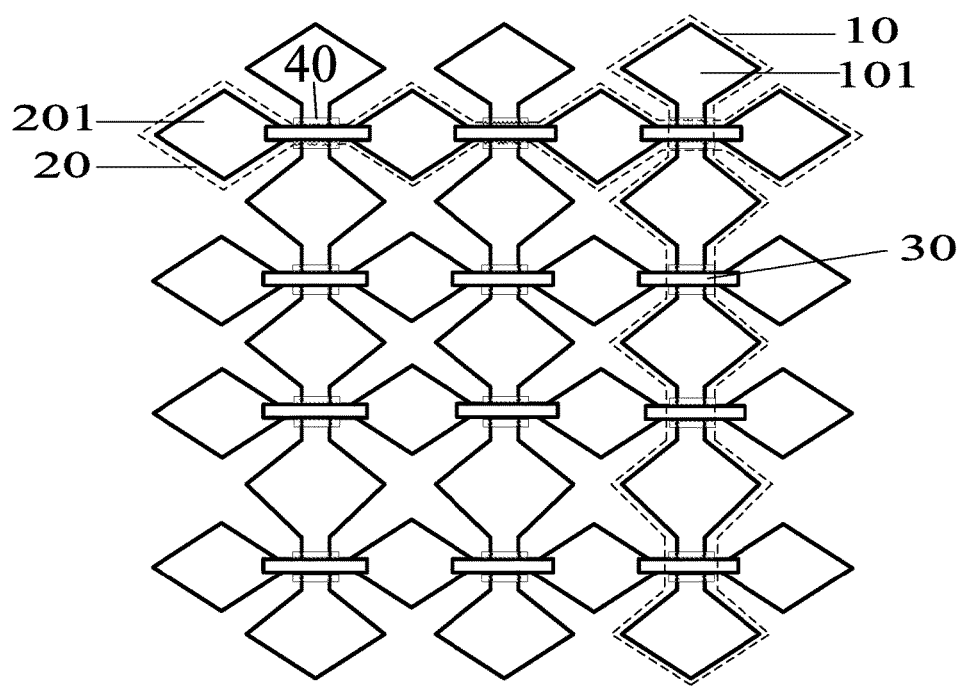
FIG. 1 is a diagram illustrating a conventional touch electrode structure.

FIG. 1 is a diagram illustrating the structure of a conventional touch electrode structure. Referring to FIG. 1, the conventional touch electrode structure includes a touch electrode layer having a plurality of columns of first touch electrodes 101 and a plurality of rows of second touch electrodes 201 crossing over each other. The plurality of first touch electrodes 101 in each column 10 are directly electrically connected to each other. The conventional touch electrode structure further includes an insulating layer 40 on a side of the touch electrode layer distal to the base substrate, and an electrode bridge layer 30 on a side of the insulating layer 40 distal to the touch electrode layer. The plurality of second touch electrode 201 in each row 20 are electrically connected through a plurality of electrode bridges in the electrode bridge layer 30. Thus, at least three mask plates are required to fabricate a conventional touch electrode structure. At least five mask plates are required to fabricate a conventional touch substrate including the touch electrode structure, a black matrix layer, and a color filter layer, adding to the manufacturing costs.

Accordingly, the present invention provides, inter alia, a touch substrate, a touch display panel and a display apparatus having the same, and a fabricating method thereof that substantially obviate one or more of the problems due to limitations and disadvantages of the related art. In one aspect, the present disclosure provides a touch substrate having a black matrix layer and a touch electrode layer including a plurality of columns of first touch electrodes, a plurality of rows of second touch electrodes, and a plurality of columns of electrode bridges in a same layer and made of a same electrode material. Optionally, the touch electrode layer is on a side of the black matrix layer distal to the base substrate. Optionally, the black matrix layer is on a side of the touch electrode layer distal to the base substrate. In the touch electrode layer, the plurality of columns of first touch electrodes are insulated from the plurality of rows of second touch electrodes, and cross over the plurality of rows of second touch electrodes forming a plurality of intersections. In the present touch substrate, a plurality of first touch electrode in each column are electrically connected by a plurality of electrode bridges, and a plurality of second touch electrode in each row are electrically connected by the black matrix layer. In some embodiments, two adjacent first touch electrodes along a column direction are electrically connected at each intersection through an electrode bridge. Second touch electrodes in each row are spaced apart from each other along a row direction. Two adjacent second touch electrodes along the row direction are electrically connected at each intersection through the black matrix layer. Optionally, the touch substrate is an in-cell touch substrate.

In some embodiments, the black matrix layer includes a plurality of columns of first black matrix blocks, a plurality of rows of second black matrix blocks, and a plurality of rows of black matrix bridges in a same layer and made of a same black matrix material. Two adjacent second black matrix blocks along the row direction are electrically connected at each intersection through a black matrix bridge. Two adjacent first black matrix blocks along the column direction are insulated from each other at each intersection. The plurality of columns of first black matrix blocks are insulated from the plurality of rows of second black matrix blocks. Two adjacent second touch electrodes along the row direction are electrically connected at each intersection through a black matrix bridge.

As used herein, the term "same layer" refers to the relationship between the layers simultaneously formed in the same step. In one example, the plurality of columns of first touch electrodes, the plurality of rows of second touch electrodes, and the plurality of columns of electrode bridges are in a same layer when they are formed as a result of one or more steps of a same patterning process performed in a same layer of material. In another example, the plurality of columns of first touch electrodes, the plurality of rows of second touch electrodes, and the plurality of columns of electrode bridges can be formed in a same layer by simultaneously performing the step of forming the plurality of columns of first touch electrodes, the step of forming the plurality of rows of second touch electrodes, and the step of forming the plurality of columns of electrode bridges. The term "same layer" does not always mean that the thickness of the layer or the height of the layer in a cross-sectional view is the same. In another example, the plurality of columns of first black matrix blocks, the plurality of rows of second black matrix blocks, and the plurality of rows of black matrix bridges are in a same layer when they are formed as a result of one or more steps of a same patterning process performed in a same layer of material. In another example, the plurality of columns of first black matrix blocks, the plurality of rows of second black matrix blocks, and the plurality of rows of black matrix bridges can be formed in a same layer by simultaneously performing the step of forming the plurality of columns of first black matrix blocks, the step of forming the plurality of rows of second black matrix blocks, and the step of forming the plurality of rows of black matrix bridges.

Figure 2A:
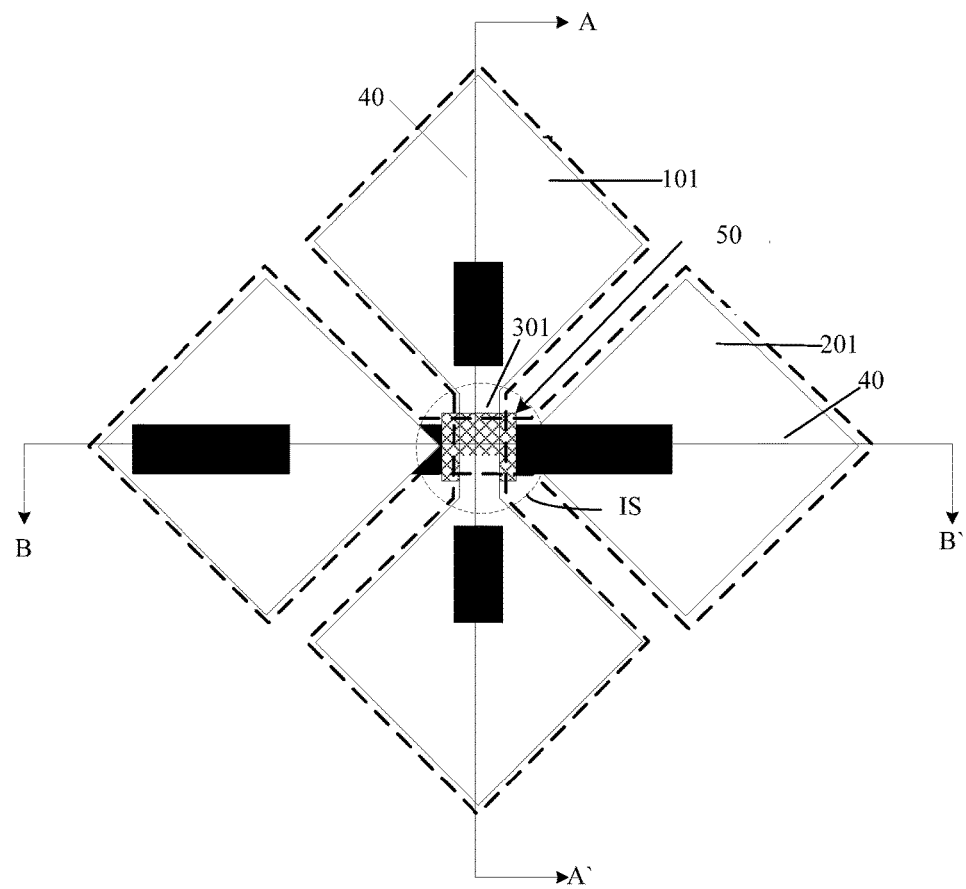
FIG. 2A is a diagram illustrating a touch substrate in some embodiments according to the present disclosure.
Figure 2B:
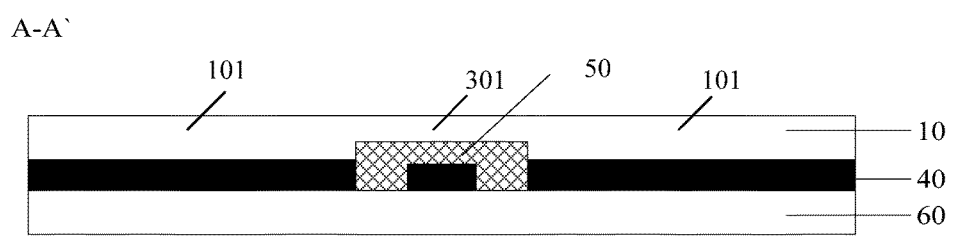
FIG. 2B shows a cross-sectional view along the A-A' direction of the touch substrate in FIG. 2A.
Figure 2C:
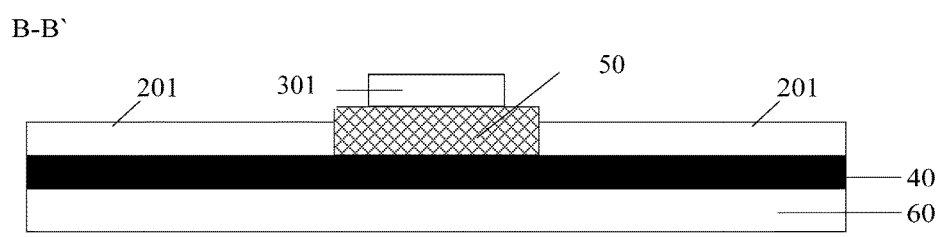
FIG. 2C shows a cross-sectional view along the B-B' direction of the touch substrate in FIG. 2A.

FIG. 2A is a diagram illustrating a touch substrate in some embodiments according to the present disclosure. FIG. 2B shows a cross-sectional view along the A-A' direction of the touch substrate in FIG. 2A. FIG. 2C shows a cross-sectional view along the B-B' direction of the touch substrate in FIG. 2A. Referring to FIGS. 2A, 2B, and 2C, the touch substrate in some embodiments includes a base substrate 60, a black matrix layer 40 on the base substrate 60, and a touch electrode layer on a side of the black matrix layer 40 distal to the base substrate 60. The touch electrode layer includes a plurality of columns of first touch electrodes 101, a plurality of rows of second touch electrodes 201, and a plurality of columns of electrode bridges 301 in a same layer and made of a same electrode material. As shown in FIG. 2A, the plurality of columns of first touch electrodes 101 are insulated from the plurality of rows of second touch electrodes 201. The plurality of columns of first touch electrodes 101 and the plurality of rows of second touch electrodes 201 cross over each other forming a plurality of intersections IS. Two adjacent first touch electrodes 101 along a column direction are electrically connected at each intersection through an electrode bridge 301. Second touch electrodes 201 in each row are spaced apart from each other along a row direction. Two adjacent second touch electrodes 201 along the row direction are electrically connected at each intersection IS through the black matrix layer 40. First touch electrodes 101 and electrode bridges 301 in each column are of an integral structure. Moreover, first touch electrodes 101 in two adjacent columns are spaced apart and insulated from each other, second touch electrodes 201 in two adjacent rows are spaced apart and insulated from each other.

Various transparent conductive materials and various appropriate fabricating methods may be used for making the touch electrode layer. For example, a transparent conductive material may be deposited on the substrate by a plasma-enhanced chemical vapor deposition (PECVD) process. Examples of transparent conductive materials suitable for making the touch electrode layer include, but are not limited to, a transparent metal oxide material, nano-silver, nano-carbon tube, and graphene. Examples of transparent metal oxide materials include, but are not limited to, indium tin oxide, indium zinc oxide, indium gallium oxide, indium gallium zinc oxide. Optionally, the touch electrode layer is made of indium tin oxide.

Referring to FIGS. 2A, 2B, and 2C, the touch substrate in some embodiments further includes an insulating layer having a plurality of insulating blocks 50. The plurality of columns of first touch electrodes 101 are insulated from the plurality of rows of second touch electrodes 201 at the plurality of intersections IS by the plurality of insulating blocks 50.

The black matrix layer 40 electrically connects adjacent second touch electrodes 201 along the row direction, but does not electrically connects a first touch electrode 101 and a second touch electrode 201.

In the present touch substrate, the second touch electrodes along the row direction are electrically connected by the black matrix layer, obviating the need for an insulating layer and an electrode bridge layer on top of the insulating layer for connecting the second touch electrodes. The touch electrode layer in the present touch substrate may be formed using a single mask plate. The present touch substrate including the touch layer, the black matrix layer, and a color filter layer may be formed using only three mask plates. As compared to the conventional touch substrate, the present touch substrate may be fabricated using a much simplified process and lower manufacturing costs.

Figure 3:
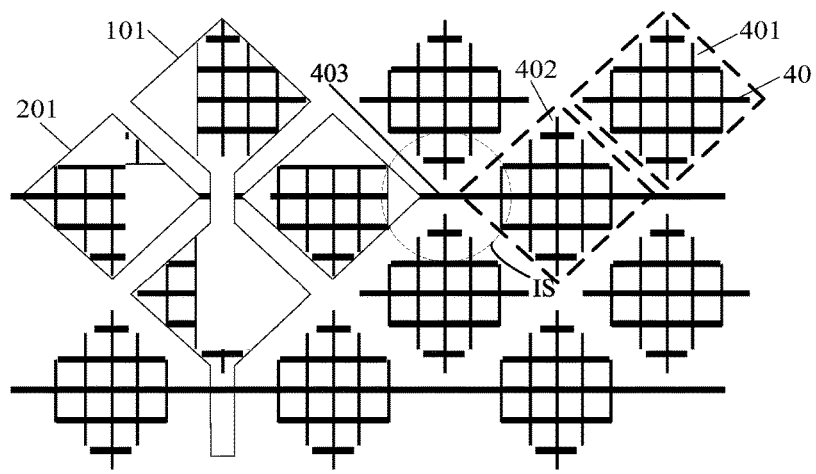
FIG. 3 is a diagram illustrating the structure of a black matrix layer in some embodiments according to the present disclosure.

FIG. 3 is a diagram illustrating the structure of a black matrix layer in some embodiments according to the present disclosure. Referring to FIG. 3, the black matrix layer in some embodiments includes a plurality of columns of first black matrix blocks 401 corresponding to the plurality of first touch electrode 101, a plurality of rows of second black matrix blocks 402 corresponding to the plurality of second touch electrodes 201, and a plurality of rows of black matrix bridges 403 in a same layer and made of a same black matrix material. Two adjacent second black matrix blocks 201 along the row direction are electrically connected at each intersection IS through a black matrix bridge 403. Two adjacent first black matrix blocks 401 along the column direction are spaced apart from each other and are insulated from each other at each intersection IS. The plurality of columns of first black matrix blocks 401 are insulated from the plurality of rows of second black matrix blocks 402. Second black matrix blocks 402 and black matrix bridges 403 in each row are of an integral structure. Two adjacent second touch electrodes 201 along the row direction are electrically connected at each intersection IS through the integral structure, e.g., a black matrix bridge 403.

In the present touch substrate, the black matrix layer is a dual-functional black matrix layer. First, the black matrix layer is disposed in the inter-subpixel regions of the touch substrate for preventing light leakage. Second, the present black matrix layer also functions to electrically connect the adjacent second touch electrodes along the row direction, but does not electrically connect a first touch electrode and a second touch electrode. Accordingly, in one aspect, the present disclosure also provides a novel black matrix layer including a plurality of columns of first black matrix blocks, a plurality of rows of second black matrix blocks, and a plurality of rows of black matrix bridges in a same layer and made of a same black matrix material. In the present black matrix layer, two adjacent second black matrix blocks along the row direction are electrically connected at each intersection through a black matrix bridge, two adjacent first black matrix blocks along the column direction are insulated from each other at each intersection, and all first black matrix blocks are insulated from all second black matrix blocks.

Referring to FIG. 3, to electrically connecting adjacent second touch electrodes along the row direction, the adjacent second touch electrodes along the row direction are made to be electrically connected at each intersection through a black matrix bridge. As shown in FIG. 3, each first black matrix block 401 corresponds to a first touch electrode 101, and each second black matrix block 402 corresponds to a second touch electrode 201. Because the black matrix layer in the embodiment is made of a conductive black matrix material, in some embodiments, each first black matrix block 401 is electrically connected to a corresponding first touch electrode 101, and each second black matrix block 402 is electrically connected to a corresponding second touch electrode 201. To ensure that first touch electrodes 101 are insulated from second touch electrodes 201 (e.g., not electrically connected through the black matrix layer), all first black matrix blocks 401 are spaced apart and insulated from all second black matrix blocks 402, and all first black matrix blocks 401 are spaced apart and insulated from each other. For example, any two adjacent first black matrix blocks 401 along the column direction are spaced apart and insulated from each other at each intersection IS. Moreover, first black matrix blocks 401 in two adjacent columns are spaced apart and insulated from each other, second black matrix blocks 402 in two adjacent rows are spaced apart and insulated from each other.

The first black matrix block 401 and the black matrix block 402 may have any appropriate shapes and dimensions. Optionally, the first black matrix block 401 has a shape and a dimension corresponding to the first touch electrode 101. Optionally, the second black matrix block 402 has a shape and a dimension corresponding to the second touch electrode 201. Optionally, the first black matrix block 401 and the second black matrix block 402 have a square shape.

In the present touch substrate, any two adjacent first black matrix blocks 401 along the column direction are spaced apart and insulated from each other at each intersection IS, all first black matrix blocks 401 are spaced apart and insulated from all second black matrix blocks 402, and all first black matrix blocks 401 are spaced apart and insulated from each other. As a result, first touch electrodes 101 are insulated from second touch electrodes 201, e.g., not electrically connected through the black matrix layer. On the other hand, adjacent second touch electrodes along the row direction are electrically connected at each intersection through a black matrix bridge, thus adjacent second touch electrodes along the row direction are electrically connected through the black matrix layer, e.g., through a black matrix bridge.

Various black matrix materials and various appropriate fabricating methods may be used for making the touch electrode layer. For example, a black matrix material may be deposited on the substrate by a plasma-enhanced chemical vapor deposition (PECVD) process. Examples of black matrix materials suitable for making the black matrix layer include, but are not limited to, a conductive black metal, a conductive black metal oxide, or a conductive metal with a blackened surface. Examples of conductive black metals include, but are not limited to, manganese steel and copper. Examples of conductive black metal oxides include, but are not limited to, iron (II, Ill) oxide ($Fe_3O_4$), and ferric oxide ($Fe_2O_3$). Examples of conductive metals with a blackened surface include, but are not limited to, copper with a blackened surface, zinc with a blackened surface, and aluminum with a blackened surface.

In some embodiments, the touch substrate further includes an insulation layer having a plurality of insulating blocks, the plurality of columns of first touch electrodes are insulated from the plurality of rows of second touch electrodes at the plurality of intersections by the plurality of insulating blocks. To further simplify the fabricating process, the insulating layer may be fabricated in a same process, in a same layer, and using a same material as another layer in the touch substrate. For example, the insulation layer may be a part of one or more color filter layer in the touch substrate, and a portion of the color filter layer insulates a first touch electrode from a second touch electrode at each intersection.

Figure 4A:
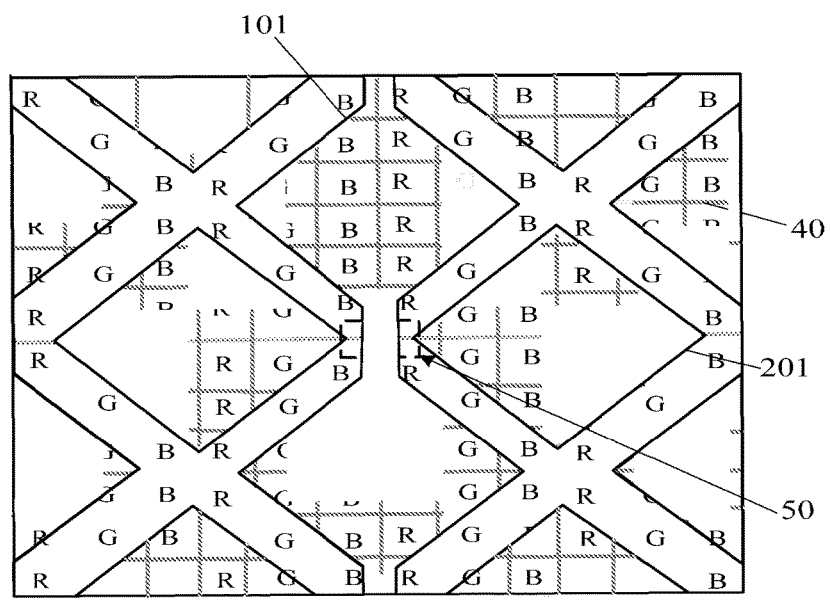
FIG. 4A is a diagram illustrating the structure of a touch substrate in some embodiments according to the present disclosure.

FIG. 4A is a diagram illustrating the structure of a touch substrate in some embodiments according to the present disclosure. Referring to FIG. 4A, the touch substrate in some embodiments includes at least a first color filter layer on a base substrate 60 (e.g., one or more of a red color filter R, a green color filter G, and a blue color filter B). A portion 50 of at least a first color filter layer is disposed at each intersection, insulating a corresponding first touch electrode from a corresponding second touch electrode at the intersection. The plurality of columns of first touch electrodes 101 are insulated from the plurality of rows of second touch electrodes 201 at the plurality of intersections by the first color filter layer. Accordingly, the portion 50 insulating the first touch electrode 101 from the second touch electrode 201 at each intersection may be formed in a same process, in a same layer, and using a same material as at least a first color filter layer. Optionally, the portion 50 insulating the first touch electrode 101 from the second touch electrode 201 at each intersection may is a laminated structure including a first sub-portion and a second sub-portion, the first sub-portion is formed in a same process, in a same layer, and using a same material as at least a first color filter layer, and the second sub-portion is formed in a same process, in a same layer, and using a same material as at least a second color filter layer.

In some embodiments, the touch substrate includes a first color filter layer, a second color filter layer, and a third color filter layer (e.g., a red color filter R, a green color filter G, and a blue color filter B in FIG. 4A).

In some embodiments, the first color filter layer includes a plurality of first color filter blocks corresponding to a plurality of subpixel of first color; and a plurality of first color filter islands corresponding to the plurality of intersections. The plurality of first color filter blocks and the plurality of first color filter islands are in a same layer and made of a same insulating color filter material; and a first touch electrode and a second touch electrodes at each intersection are insulated by a corresponding first color filter island.

In some embodiments, the second color filter layer includes a plurality of second color filter blocks corresponding to a plurality of subpixel of second color; and a plurality of second color filter islands corresponding to the plurality of intersections. The plurality of second color filter blocks and the plurality of second color filter islands are in a same layer and made of a same insulating color filter material. Optionally, a laminated structure including a first color filter island and a second color filter island at each intersection is sandwiched by an electrode bridge and a black matrix bridge. Optionally, an electrode bridge at each intersection is sandwiched by a first color filter island and a second color filter island.

In some embodiments, the third color filter layer includes a plurality of third color filter blocks corresponding to a plurality of subpixel of third color; and a plurality of third color filter islands corresponding to the plurality of intersections. The plurality of third color filter blocks and the plurality of third color filter islands are in a same layer and made of a same insulating color filter material. Optionally, a laminated structure including a first color filter island, a second color filter island, and a third color filter island at each intersection is sandwiched by an electrode bridge and a black matrix bridge. Optionally, an electrode bridge at each intersection is sandwiched by a first color filter island and a laminated structure including a second color filter island and a third color filter island.

In some embodiments, the touch substrate includes a first color filter layer having a plurality of first color filter blocks corresponding to a plurality of subpixel of first color, a second color filter layer having a plurality of second color filter blocks corresponding to a plurality of subpixel of second color, a third color filter layer having a plurality of third color filter blocks corresponding to a plurality of subpixel of third color, and at least one of the first color filter layer, the second color filter layer, and the third color filter layer further includes a plurality of color filter islands corresponding to the plurality of intersections. Optionally, at least two of the first color filter layer, the second color filter layer, and the third color filter layer includes a plurality of color filter islands corresponding to the plurality of intersections, e.g., a plurality of first color filter islands and a plurality of second color filter island. Optionally, all of the first color filter layer, the second color filter layer, and the third color filter layer includes a plurality of color filter islands corresponding to the plurality of intersections, e.g., a plurality of first color filter islands, a plurality of second color filter islands, and a plurality of third color filter islands. Optionally, a second color filter island at each intersection is on a side of the first electrode bridge distal to the first color filter island. Optionally, a second color filter island at each intersection is on a side of the first electrode bridge proximal to the first color filter island. Optionally, a third color filter island at each intersection is on a side of the first electrode bridge distal to the first color filter island. Optionally, a third color filter island at each intersection is on a side of the first electrode bridge proximal to the first color filter island.

When the second color filter island at each intersection is on a side of the first electrode bridge distal to the first color filter island, the second color filter island may be utilized as a post spacer for maintaining a spacing between the touch substrate and the array substrate. The second color filter island is in contact with the array substrate, Similarly, when both a second color filter island and a third color filter island at each intersection are on a side of the first electrode bridge distal to the first color filter island, a laminated structure including the second color filter island and the third color filter island may be utilized as a post spacer for maintaining a spacing between the touch substrate and the array substrate. The laminated structure is in contact with the array substrate.

As discussed above, and referring to FIG. 3 and FIG. 4A, to ensure that first touch electrodes 101 are insulated from second touch electrodes 201 (e.g., not electrically connected through the black matrix layer), all first black matrix blocks 401 are spaced apart and insulated from all second black matrix blocks 402, and all first black matrix blocks 401 are spaced apart and insulated from each other. For example, any two adjacent first black matrix blocks 401 along the column direction are spaced apart and insulated from each other at each intersection IS. Moreover, first black matrix blocks 401 in two adjacent columns are spaced apart and insulated from each other, second black matrix blocks 402 in two adjacent rows are spaced apart and insulated from each other. As such, when the touch substrate includes a first color filter island, a second color filter island, and optionally a third color filter island at the intersection, they are not separated by a black matrix layer 40. However, the gap between adjacent first touch electrodes 101, the gap between adjacent second touch electrodes 201, and the gap between adjacent first touch electrode 101 and second touch electrode 201, are very small. Only a very small portion of the first color filter island, the second color filter island, and optionally the third color filter island are not separated by the black matrix layer 40, the effect on display quality is negligible.

In some embodiments, the plurality of intersections are at positions corresponding to a plurality of thin film transistors in a plurality of subpixels. This design further minimizes the adverse effect, if any, of the color filter islands at the intersections on display quality.

Figure 4B:
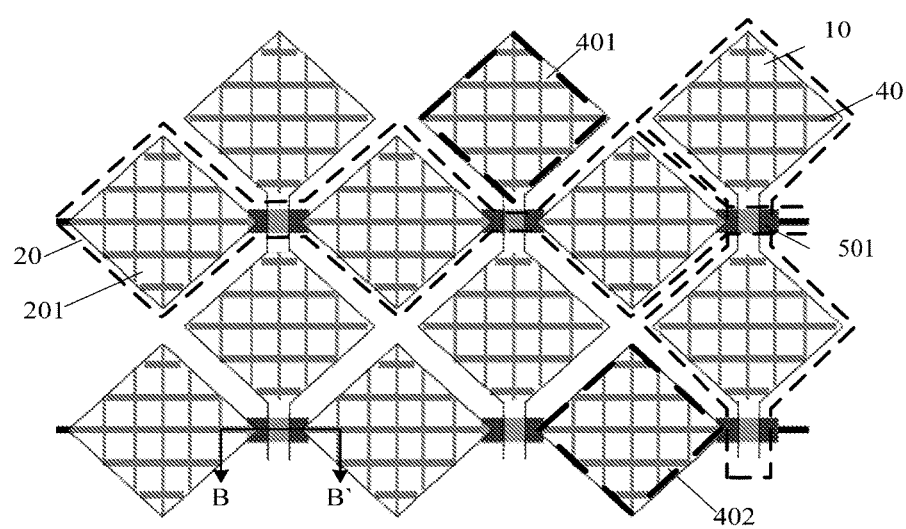
FIG. 4B is a diagram illustrating the structure of a touch substrate in some embodiments according to the present disclosure.
Figure 4C:
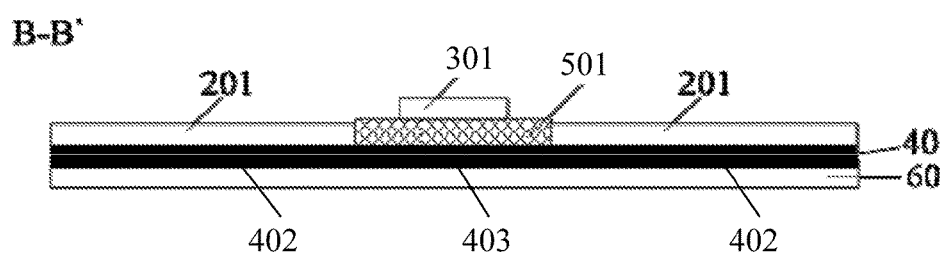
FIG. 4C shows a cross-sectional view along the B-B' direction of the touch substrate in FIG. 4B having a first color filter island at the intersection between the first touch electrode and the second touch electrode.

FIG. 4B is a diagram illustrating the structure of a touch substrate in some embodiments according to the present disclosure. FIG. 4C shows a cross-sectional view along the B-B' direction of the touch substrate in FIG. 4B having a first color filter island at the intersection between the first touch electrode and the second touch electrode. Referring to FIG. 4B and FIG. 4C, the touch substrate in some embodiments includes a first color filter island 501 at each intersection (but does not include a second color filter island or a third color filter island). The first color filter island 501 is an insulating island, a first touch electrode 101 and a second touch electrodes 201 at each intersection are insulated by a corresponding first color filter island 501. More specifically, an electrode bridge 301 and a black matrix bridge 403 at each intersection are insulated by the corresponding first color filter island 501.

Figure 4D:
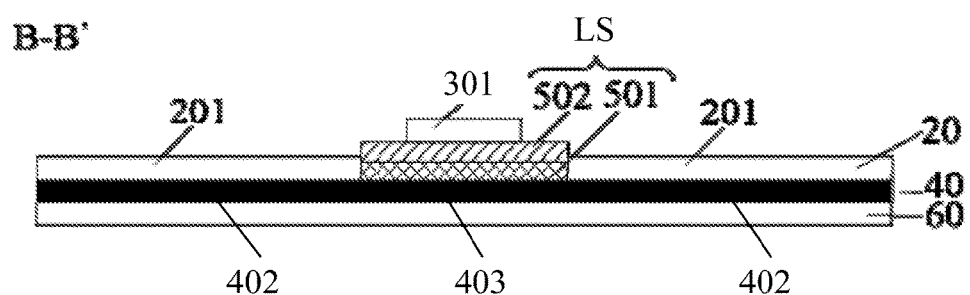
FIG. 4D shows a cross-sectional view along the B-B' direction of the touch substrate in FIG. 4B having a first color filter island and a second color filter island at the intersection between the first touch electrode and the second touch electrode.

FIG. 4D shows a cross-sectional view along the B-B' direction of the touch substrate in FIG. 4B having a first color filter island and a second color filter island at the intersection between the first touch electrode and the second touch electrode. Referring to FIG. 4D, the touch substrate in some embodiments includes a first color filter island 501 and a second color filter island 502 at each intersection. The first color filter island 501 and the second color filter island 502 at each intersection form a laminated structure LS, which is an insulating island. The laminated structure LS is sandwiched by an electrode bridge 301 and a black matrix bridge 403 at the intersection, i.e., the first color filter island 501 and the second color filter island 502 is on a side of the electrode bridge 301 proximal to the black matrix bridge 403. The first touch electrode 101 and a second touch electrodes 201 at each intersection are insulated by a corresponding laminated structure LS. More specifically, an electrode bridge 301 and a black matrix bridge 403 at each intersection are insulated by the corresponding laminated structure LS.

Figure 4E:
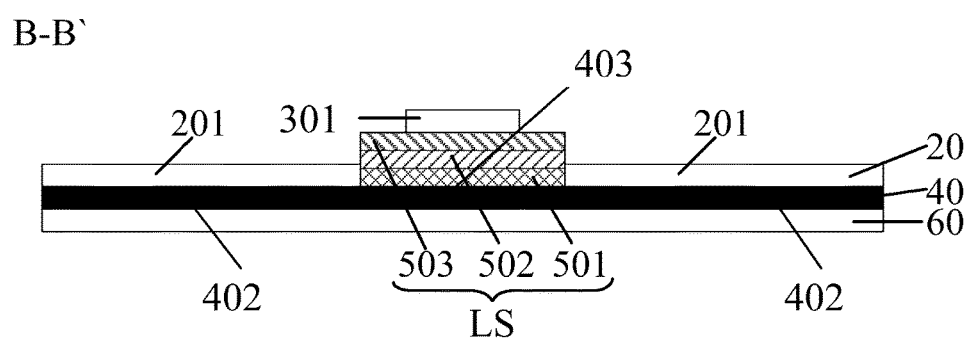
FIG. 4E shows a cross-sectional view along the B-B' direction of the touch substrate in FIG. 4B having a first color filter island, a second color filter island, and a third color filter island at the intersection between the first touch electrode and the second touch electrode.

FIG. 4E shows a cross-sectional view along the B-B' direction of the touch substrate in FIG. 4B having a first color filter island, a second color filter island, and a third color filter island at the intersection between the first touch electrode and the second touch electrode. Referring to FIG. 4E, the touch substrate in some embodiments includes a first color filter island 501, a second color filter island 502, and a third color filter island 503 at each intersection. The first color filter island 501, the second color filter island 502, and the third color filter island 503 at each intersection form a laminated structure LS, which is an insulating island. The laminated structure LS is sandwiched by an electrode bridge 301 and a black matrix bridge 403 at the intersection, i.e., the first color filter island 501, the second color filter island 502, and the third color filter island 503 is on a side of the electrode bridge 301 proximal to the black matrix bridge 403. The first touch electrode 101 and a second touch electrodes 201 at each intersection are insulated by a corresponding laminated structure LS. More specifically, an electrode bridge 301 and a black matrix bridge 403 at each intersection are insulated by the corresponding laminated structure LS.

In the present touch substrate, the insulating island insulating first touch electrode (i.e., an electrode bridge associated therewith) from second touch electrode a black matrix bridge associated therewith) may be formed as a part of one or more color filter layers in the touch substrate, i.e., fabricated in a same process, in a same layer, and using a same material as one or more color filter layers in the touch substrate. As such, the touch layer, the black matrix layer, and a color filter layer in the present touch substrate may be formed using only three mask plates. As compared to the conventional touch substrate, the present touch substrate may be fabricated using a much simplified process and lower manufacturing costs.

Figure 5A:
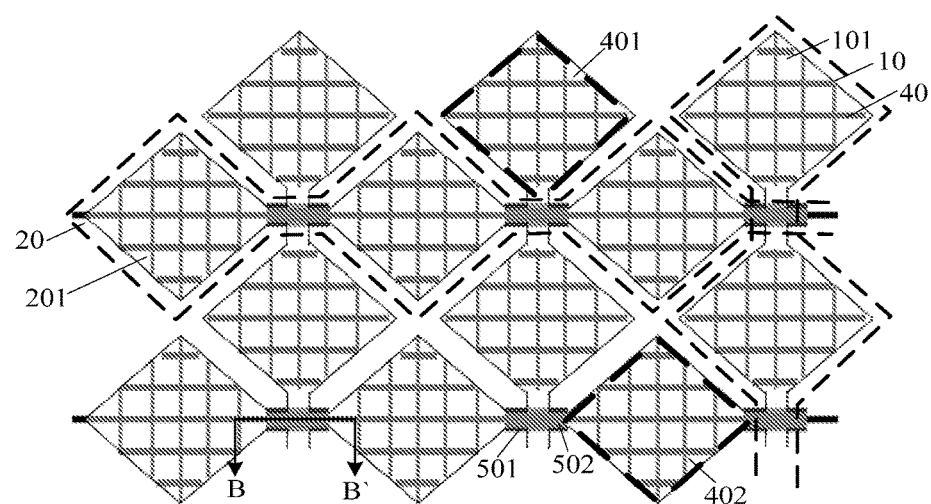
FIG. 5A is a diagram illustrating the structure of a touch substrate in some embodiments according to the present disclosure.
Figure 5B:
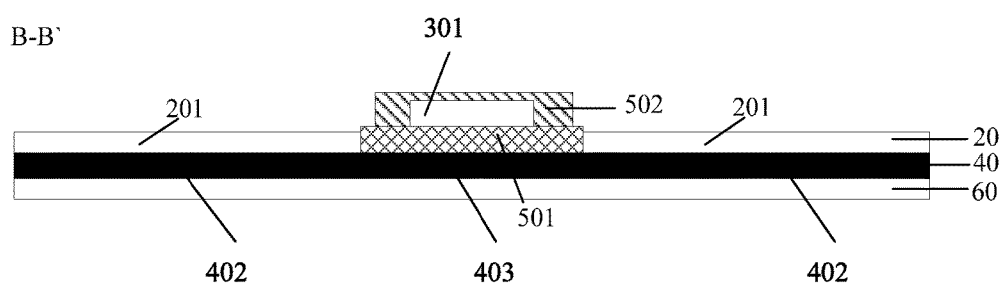
FIG. 5B shows a cross-sectional view along the B-B' direction of the touch substrate in FIG. 5A having a first color filter island and a second color filter island at the intersection between the first touch electrode and the second touch electrode.

FIG. 5A is a diagram illustrating the structure of a touch substrate in some embodiments according to the present disclosure. FIG. 5B shows a cross-sectional view along the B-B' direction of the touch substrate in FIG. 5A having a first color filter island and a second color filter island at the intersection between the first touch electrode and the second touch electrode. Referring to FIG. 5A and FIG. 5B, the touch substrate in some embodiments includes a first color filter island 501 and a second color filter island 502 at each intersection. The first color filter island 501 is an insulating island, a first touch electrode 101 and a second touch electrodes 201 at each intersection are insulated by a corresponding first color filter island 501. More specifically, an electrode bridge 301 and a black matrix bridge 403 at each intersection are insulated by the corresponding first color filter island 501. The second color filter island 502 is on a side of the electrode bridge 301 distal to the black matrix bridge 403, i.e., the electrode bridge 301 at each intersection is sandwiched by a first color filter island 501 and a second color filter island 502.

Optionally, the second color filter island 502 is utilized as a post spacer for maintaining a spacing between the touch substrate and the array substrate when they are assembled into a cell. The second color filter island is in contact with the array substrate in the assembled cell. By having this design, a post spacer layer may be formed as a part of one or more color filter layers in the touch substrate, i.e., fabricated in a same process, in a same layer, and using a same material as one or more color filter layers in the touch substrate. This process further simplifies the fabricating process.

Figure 5C:
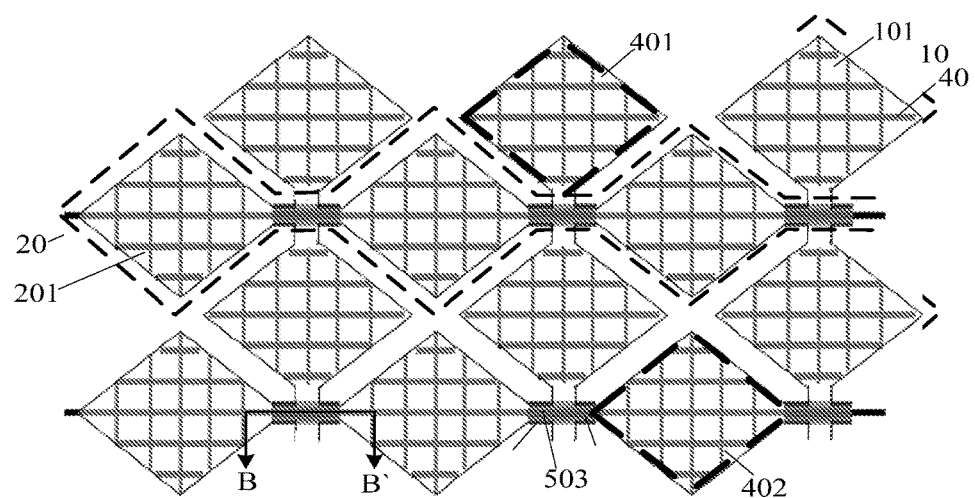
FIG. 5C is a diagram illustrating the structure of a touch substrate in some embodiments according to the present disclosure.
Figure 5D:
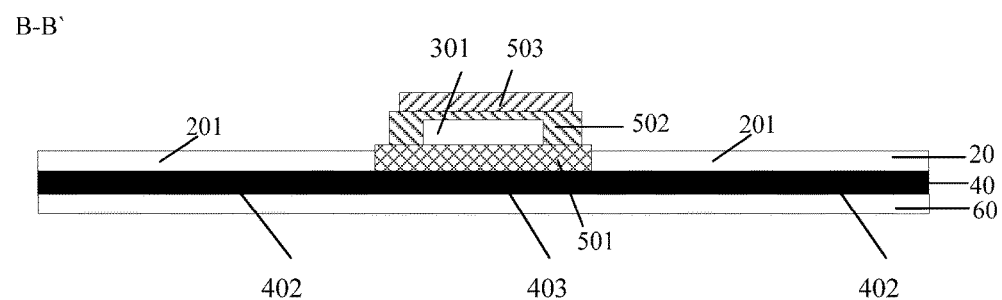
FIG. 5D shows a cross-sectional view along the B-B' direction of the touch substrate in FIG. 5C having a first color filter island, a second color filter island, and a third color filter island at the intersection between the first touch electrode and the second touch electrode.

FIG. 5C is a diagram illustrating the structure of a touch substrate in some embodiments according to the present disclosure. FIG. 5D shows a cross-sectional view along the B-B' direction of the touch substrate in FIG. 5C having a first color filter island, a second color filter island, and a third color filter island at the intersection between the first touch electrode and the second touch electrode. Referring to FIG. 5C and FIG. 5D, the touch substrate in some embodiments includes a first color filter island 501, a second color filter island 502, and a third color filter island 503 at each intersection. The first color filter island 501 is an insulating island, a first touch electrode 101 and a second touch electrodes 201 at each intersection are insulated by a corresponding first color filter island 501. More specifically, an electrode bridge 301 and a black matrix bridge 403 at each intersection are insulated by the corresponding first color filter island 501. The second color filter island 502 and the third color filter island 503 are on a side of the electrode bridge 301 distal to the black matrix bridge 403, i.e., the electrode bridge 301 at each intersection is sandwiched by a first color filter island 101 and a laminated structure including the second color filter island 502 and the third color filter island 503.

Optionally, the laminated structure including the second color filter island 502 and the third color filter island 503 is utilized as a post spacer for maintaining a spacing between the touch substrate and the array substrate when they are assembled into a cell. The laminated structure is in contact with the array substrate in the assembled cell, By having this design, a post spacer layer may be formed as a part of one or more color filter layers in the touch substrate, i.e., fabricated in a same process, in a same layer, and using a same material as one or more color filter layers in the touch substrate. This process further simplifies the fabricating process. The thickness of the post spacer may be adjusted by either having a single layer color filter layer as the post spacer, or having a laminated structure having two color filter layers as the post spacer.

In another aspect, the present disclosure provides a touch display panel including a touch substrate described herein or fabricated by a method described herein, and an array substrate facing the touch substrate. In some embodiments, the touch display panel is an organic light emitting diode display panel. In some embodiments, the touch display panel is a liquid crystal display panel. Optionally, the touch display panel includes a plurality of subpixels. Optionally, the touch display panel is a liquid crystal display panel and includes a plurality of subpixels, each of which includes a plurality of subpixels, each of which includes a thin film transistor, a pixel electrode, and a common electrode. Optionally, the touch display panel is an in-cell touch display panel.

In some embodiments, the touch substrate in the present touch display panel includes a touch electrode layer including a plurality of columns of first touch electrodes, a plurality of rows of second touch electrodes, and a plurality of columns of electrode bridges in a same layer and made of a same electrode material. In the touch electrode layer, the plurality of columns of first touch electrodes are insulated from the plurality of rows of second touch electrodes, and cross over the plurality of rows of second touch electrodes forming a plurality of intersections. Two adjacent first touch electrodes along a column direction are electrically connected at each intersection through an electrode bridge. Second touch electrodes in each row are spaced apart from each other along a row direction.

In some embodiments, the present touch display panel further includes an insulation layer having a plurality of insulating blocks, the plurality of columns of first touch electrodes are insulated from the plurality of rows of second touch electrodes at the plurality of intersections by the plurality of insulating blocks. To further simplify the fabricating process, the insulating layer may be fabricated in a same process, in a same layer, and using a same material as another layer in the touch substrate. For example, the insulation layer may be a part of one or more color filter layer in the touch substrate, and a portion of the color filter layer insulates a first touch electrode from a second touch electrode at each intersection.

Figure 6:
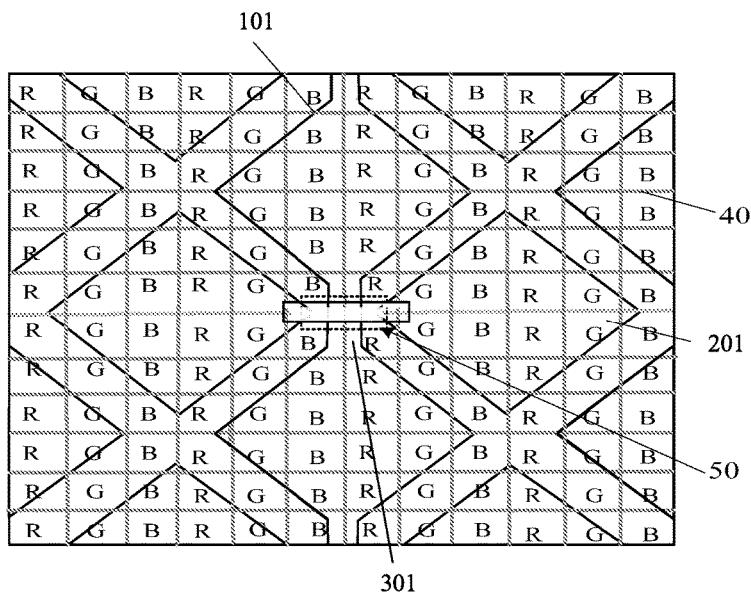
FIG. 6 is a diagram illustrating the structure of a touch substrate in some embodiments according to the present disclosure.

FIG. 6 is a diagram illustrating the structure of a touch substrate in some embodiments according to the present disclosure. Referring to FIG. 6, the present touch display panel includes a touch electrode layer including a plurality of columns of first touch electrodes 101, a plurality of rows of second touch electrodes 201, and a plurality of columns of electrode bridges 301 in a same layer and made of a same electrode material. The plurality of columns of first touch electrodes 101 are insulated from the plurality of rows of second touch electrodes 201, and cross over the plurality of rows of second touch electrodes 201 forming a plurality of intersections. Two adjacent first touch electrodes 101 along a column direction are electrically connected at each intersection through an electrode bridge 301. Second touch electrodes 201 in each row are spaced apart from each other along a row direction. The present touch display panel further includes at least a first color filter layer, a portion 50 of which is disposed at each intersection insulating a corresponding first touch electrode from a corresponding second touch electrode at the intersection.

The plurality of columns of first touch electrodes 101 are insulated from the plurality of rows of second touch electrodes 201 at the plurality of intersections by the first color filter layer. Accordingly, the portion 50 insulating the first touch electrode 101 from the second touch electrode 201 at each intersection may be formed in a same process, in a same layer, and using a same material as at least a first color filter layer. Optionally, the portion 50 insulating the first touch electrode 101 from the second touch electrode 201 at each intersection may is a laminated structure including a first sub-portion and a second sub-portion, the first sub-portion is formed in a same process, in a same layer, and using a same material as at least a first color filter layer, and the second sub-portion is formed in a same process, in a same layer, and using a same material as at least a second color filter layer. Optionally, the portion 50 insulating the first touch electrode 101 from the second touch electrode 201 at each intersection may is a laminated structure including a first sub-portion, a second sub-portion, and a third sub-portion, the first sub-portion is formed in a same process, in a same layer, and using a same material as at least a first color filter layer, the second sub-portion is formed in a same process, in a same layer, and using a same material as at least a second color filter layer, and the third sub-portion is formed in a same process, in a same layer, and using a same material as at least a third color filter layer.

In some embodiments, the plurality of intersections are at positions corresponding to a plurality of thin film transistors in a plurality of subpixels. This design further minimizes the adverse effect, if any, of the color filter islands at the intersections on display quality.

In the present touch display panel, the insulating island insulating first touch electrode from second touch electrode may be formed as a part of one or more color filter layers in the touch substrate, i.e., fabricated in a same process, in a same layer, and using a same material as one or more color filter layers in the touch substrate. As such, the present touch display panel may be fabricated using a reduced number of mask plates as compared to the conventional touch display panel, achieving a much simplified process and lower manufacturing costs.

Referring to FIG. 4A, the touch display panel in some embodiments further includes a black matrix layer 40 on a base substrate. Optionally, the touch electrode layer is on a side of the black matrix layer 40 distal to the base substrate. Optionally, the black matrix layer 40 is on a side of the touch electrode layer distal to the base substrate. Two adjacent second touch electrodes 201 along the row direction are electrically connected at each intersection through the black matrix layer 40.

The black matrix layer 40 electrically connects adjacent second touch electrodes 201 along the row direction, but does not electrically connects a first touch electrode 101 and a second touch electrode 201.

In the present touch display panel, the second touch electrodes along the row direction are electrically connected by the black matrix layer, obviating the need for an insulating layer and an electrode bridge layer on top of the insulating layer for connecting the second touch electrodes. The touch electrode layer in the present touch display panel may be fabricated using a single mask plate. The touch layer, the black matrix layer, and the color filter layer in the present touch display panel may be formed using only three mask plates. As compared to the conventional touch substrate, the present touch substrate may be fabricated using a much simplified process and lower manufacturing costs.

In some embodiments, the black matrix layer in the present touch display panel includes a plurality of columns of first black matrix blocks, a plurality of rows of second black matrix blocks, and a plurality of rows of black matrix bridges in a same layer and made of a same black matrix material. Two adjacent second black matrix blocks along the row direction are electrically connected at each intersection through a black matrix bridge. Two adjacent first black matrix blocks along the column direction are insulated from each other at each intersection. The plurality of columns of first black matrix blocks are insulated from the plurality of rows of second black matrix blocks. Two adjacent second touch electrodes along the row direction are electrically connected at each intersection through a black matrix bridge.

In the present touch display panel, the second touch electrodes along the row direction are electrically connected by the black matrix layer, obviating the need for an insulating layer and an electrode bridge layer on top of the insulating layer for connecting the second touch electrodes. The touch electrode layer in the present touch display panel may be formed using a single mask plate. The present touch display panel including the touch layer, the black matrix layer, and a color filter layer may be formed using only three mask plates. As compared to the conventional touch substrate, the present touch display panel may be fabricated using a much simplified process and lower manufacturing costs.

In the present touch display panel, the black matrix layer is a dual-functional black matrix layer. First, the black matrix layer is disposed in the inter-subpixel regions of the touch display panel for preventing light leakage. Second, the present black matrix layer also functions to electrically connect the adjacent second touch electrodes along the row direction, but does not electrically connect a first touch electrode and a second touch electrode.

Referring to FIG. 3, to electrically connecting adjacent second touch electrodes along the row direction, the adjacent second touch electrodes along the row direction are made to be electrically connected at each intersection through a black matrix bridge. As shown in FIG. 3, each first black matrix block 401 corresponds to a first touch electrode 101, and each second black matrix block 402 corresponds to a second touch electrode 201. Because the black matrix layer in the embodiment is made of a conductive black matrix material, in some embodiments, each first black matrix block 401 is electrically connected to a corresponding first touch electrode 101, and each second black matrix block 402 is electrically connected to a corresponding second touch electrode 201. To ensure that first touch electrodes 101 are insulated from second touch electrodes 201 (e.g., not electrically connected through the black matrix layer), all first black matrix blocks 401 are spaced apart and insulated from all second black matrix blocks 402, and all first black matrix blocks 401 are spaced apart and insulated from each other. For example, any two adjacent first black matrix blocks 401 along the column direction are spaced apart and insulated from each other at each intersection IS. Moreover, first black matrix blocks 401 in two adjacent columns are spaced apart and insulated from each other, second black matrix blocks 402 in two adjacent rows are spaced apart and insulated from each other.

The first black matrix block 401 and the black matrix block 402 may have any appropriate shapes and dimensions. Optionally, the first black matrix block 401 has a shape and a dimension corresponding to the first touch electrode 101.

Optionally, the second black matrix block 402 has a shape and a dimension corresponding to the second touch electrode 201.

In the present touch display panel, any two adjacent first black matrix blocks 401 along the column direction are spaced apart and insulated from each other at each intersection IS, all first black matrix blocks 401 are spaced apart and insulated from all second black matrix blocks 402, and all first black matrix blocks 401 are spaced apart and insulated from each other. As a result, first touch electrodes 101 are insulated from second touch electrodes 201, e.g., not electrically connected through the black matrix layer. On the other hand, adjacent second touch electrodes along the row direction are electrically connected at each intersection through a black matrix bridge, thus adjacent second touch electrodes along the row direction are electrically connected through the black matrix layer, e.g., through a black matrix bridge.

Various black matrix materials and various appropriate fabricating methods may be used for making the touch electrode layer in the present touch display panel. For example, a black matrix material may be deposited on the substrate by a plasma-enhanced chemical vapor deposition (PECVD) process. Examples of black matrix materials suitable for making the black matrix layer include, but are not limited to, a conductive black metal, a conductive black metal oxide, or a conductive metal with a blackened surface. Examples of conductive black metals include, but are not limited to, manganese steel and copper. Examples of conductive black metal oxides include, hut are not limited to, iron (II, III) oxide ($Fe_3O_4$), and ferric oxide ($Fe_2O_3$). Examples of conductive metals with a blackened surface include, but are not limited to, copper with a blackened surface, zinc with a blackened surface, and aluminum with a blackened surface.

In some embodiments, the touch display panel further includes a first color filter layer having a plurality of first color filter blocks corresponding to a plurality of subpixel of first color, a second color filter layer having a plurality of second color filter blocks corresponding to a plurality of subpixel of second color, a third color filter layer having a plurality of third color filter blocks corresponding to a plurality of subpixel of third color, and at least one of the first color filter layer, the second color filter layer, and the third color filter layer further includes a plurality of color filter islands corresponding to the plurality of intersections. Optionally, at least two of the first color filter layer, the second color filter layer, and the third color filter layer includes a plurality of color filter islands corresponding to the plurality of intersections, e.g., a plurality of first color filter islands and a plurality of second color filter island. Optionally, all of the first color filter layer, the second color filter layer, and the third color filter layer includes a plurality of color filter islands corresponding to the plurality of intersections, e.g., a plurality of first color filter islands, a plurality of second color filter islands, and a plurality of third color filter islands. Optionally, a second color filter island at each intersection is on a side of the first electrode bridge distal to the first color filter island. Optionally, a second color filter island at each intersection is on a side of the first electrode bridge proximal to the first color filter island. Optionally, a third color filter island at each intersection is on a side of the first electrode bridge distal to the first color filter island. Optionally, a third color filter island at each intersection is on a side of the first electrode bridge proximal to the first color filter island.

When the second color filter island at each intersection is on a side of the first electrode bridge distal to the first color filter island, the second color filter island may be utilized as a post spacer for maintaining a spacing between the touch substrate and the array substrate. The second color filter island is in contact with the array substrate. Similarly, when both a second color filter island and a third color filter island at each intersection are on a side of the first electrode bridge distal to the first color filter island, a laminated structure including the second color filter island and the third color filter island may be utilized as a post spacer for maintaining a spacing between the touch substrate and the array substrate. The laminated structure is in contact with the array substrate.

In some embodiments, the touch display panel includes a touch substrate described herein and an array substrate facing the touch substrate. The touch substrate includes a first color filter layer having a plurality of first color filter blocks corresponding to a plurality of subpixel of first color and a plurality of first color filter islands corresponding to the plurality of intersections; and a second color filter layer having a plurality of second color filter blocks corresponding to a plurality of subpixel of second color and a plurality of second color filter islands corresponding to the plurality of intersections. The plurality of first color filter blocks and the plurality of first color filter islands are in a same layer and made of a same insulating color filter material. The plurality of second color filter blocks and the plurality of second color filter islands are in a same layer and made of a same insulating color filter material. An electrode bridge at each intersection is sandwiched by a first color filter island and a second color filter island. The plurality of second color filter islands are in contact with the array substrate and configured to maintain a spacing between the touch substrate and the array substrate.

In some embodiments, the touch display panel includes a touch substrate described herein and an array substrate facing the touch substrate. The touch substrate includes a first color filter layer having a plurality of first color filter blocks corresponding to a plurality of subpixel of first color and a plurality of first color filter islands corresponding to the plurality of intersections; a second color filter layer having a plurality of second color filter blocks corresponding to a plurality of subpixel of second color and a plurality of second color filter islands corresponding to the plurality of intersections; and a third color filter layer comprising a plurality of third color filter blocks corresponding to a plurality of subpixel of third color and a plurality of third color filter islands corresponding to the plurality of intersections. The plurality of first color filter blocks and the plurality of first color filter islands are in a same layer and made of a same insulating color filter material. The plurality of second color filter blocks and the plurality of second color filter islands are in a same layer and made of a same insulating color filter material. The plurality of third color filter blocks and the plurality of third color filter islands are in a same layer and made of a same insulating color filter material. An electrode bridge at each intersection is sandwiched by a first color filter island and a laminated structure comprising a second color filter island and a third color filter island. A plurality of laminated structures are in contact with the array substrate and configured to maintain a spacing between the touch substrate and the array substrate, each of the plurality of laminated structures comprises a second color filter island and a third color filter island at each intersection.

As discussed above, and referring to FIG. 3 and FIG. 4A, to ensure that first touch electrodes 101 are insulated from second touch electrodes 201 (e.g., not electrically connected through the black matrix layer), all first black matrix blocks 401 are spaced apart and insulated from all second black matrix blocks 402, and all first black matrix blocks 401 are spaced apart and insulated from each other. For example, any two adjacent first black matrix blocks 401 along the column direction are spaced apart and insulated from each other at each intersection IS. Moreover, first black matrix blocks 401 in two adjacent columns are spaced apart and insulated from each other, second black matrix blocks 402 in two adjacent rows are spaced apart and insulated from each other. As such, when the touch display panel includes a first color filter island, a second color filter island, and optionally a third color filter island at the intersection, they are not separated by a black matrix layer 40. However, the gap between adjacent first touch electrodes 101, the gap between adjacent second touch electrodes 201, and the gap between adjacent first touch electrode 101 and second touch electrode 201, are very small. Only a very small portion of the first color filter island, the second color filter island, and optionally the third color filter island are not separated by the black matrix layer 40, the effect on display quality is negligible.

In some embodiments, the plurality of intersections are at positions corresponding to a plurality of thin film transistors in a plurality of subpixels. This design further minimizes the adverse effect, if any, of the color filter islands at the intersections on display quality.

Referring to FIG. 4B and FIG. 4C, the touch display panel in some embodiments includes a first color filter island 501 at each intersection (but does not include a second color filter island or a third color filter island). The first color filter island 501 is an insulating island, a first touch electrode 101 and a second touch electrodes 201 at each intersection are insulated by a corresponding first color filter island 501. More specifically, an electrode bridge 301 and a black matrix bridge 403 at each intersection are insulated by the corresponding first color filter island 501.

Referring to FIG. 4D, the touch display panel in some embodiments includes a first color filter island 501 and a second color filter island 502 at each intersection. The first color filter island 501 and the second color filter island 502 at each intersection form a laminated structure 50, which is an insulating island. The laminated structure 50 is sandwiched by an electrode bridge 301 and a black matrix bridge 403 at the intersection, i.e., the first color filter island 501 and the second color filter island 502 is on a side of the electrode bridge 301 proximal to the black matrix bridge 403. The first touch electrode 101 and a second touch electrodes 201 at each intersection are insulated by a corresponding laminated structure 50. More specifically, an electrode bridge 301 and a black matrix bridge 403 at each intersection are insulated by the corresponding laminated structure 50.

Referring to FIG. 4E, the touch display panel in some embodiments includes a first color filter island 501, a second color filter island 502, and a third color filter island 503 at each intersection. The first color filter island 501, the second color filter island 502, and the third color filter island 503 at each intersection form a laminated structure 50, which is an insulating island. The laminated structure 50 is sandwiched by an electrode bridge 301 and a black matrix bridge 403 at the intersection, i.e., the first color filter island 501, the second color filter island 502, and the third color filter island 503 is on a side of the electrode bridge 301 proximal to the black matrix bridge 403. The first touch electrode 101 and a second touch electrodes 201 at each intersection are insulated by a corresponding laminated structure 50. More specifically, an electrode bridge 301 and a black matrix bridge 403 at each intersection are insulated by the corresponding laminated structure 50.

In the present touch display panel, the insulating island insulating first touch electrode (i.e., an electrode bridge associated therewith) from second touch electrode (i.e., a black matrix bridge associated therewith) may be formed as a part of one or more color filter layers in the touch substrate, i.e., fabricated in a same process, in a same layer, and using a same material as one or more color filter layers in the touch substrate. As such, the touch electrode layer in the present touch display panel may be formed using a single mask plate. The touch layer, the black matrix layer, and a color filter layer in the present touch display panel may be formed using only three mask plates. As compared to the conventional touch display panel, the present touch display panel may be fabricated using a much simplified process and lower manufacturing costs.

Referring to FIG. 5A and FIG. 5B, the touch substrate in some embodiments includes a first color filter island 501 and a second color filter island 502 at each intersection. The first color filter island 501 is an insulating island, a first electrode 101 and a second touch electrodes 201 at each intersection are insulated by a corresponding first color filter island 501. More specifically, an electrode bridge 301 and a black matrix bridge 403 at each intersection are insulated by the corresponding first color filter island 501. The second color filter island 502 is on a side of the electrode bridge 301 distal to the black matrix bridge 403, i.e., the electrode bridge 301 at each intersection is sandwiched by a first color filter island 501 and a second color filter island 502.

Optionally, the second color filter island 502 is utilized as a post spacer for maintaining a spacing between the touch substrate and the array substrate when they are assembled into a cell. The second color filter island is in contact with the array substrate in the assembled cell. By having this design, a post spacer layer may be formed as a part of one or more color filter layers in the touch display panel, i.e., fabricated in a same process, in a same layer, and using a same material as one or more color filter layers in the touch display panel. This process further simplifies the fabricating process.

Referring to FIG. 5C and FIG. 5D, the touch substrate in some embodiments includes a first color filter island 501, a second color filter island 502, and a third color filter island 503 at each intersection. The first color filter island 501 is an insulating island, a first touch electrode 101 and a second touch electrodes 201 at each intersection are insulated by a corresponding first color filter island 501. More specifically, an electrode bridge 301 and a black matrix bridge 403 at each intersection are insulated by the corresponding first color filter island 501. The second color filter island 502 and the third color filter island 503 are on a side of the electrode bridge 301 distal to the black matrix bridge 403, i.e., the electrode bridge 301 at each intersection is sandwiched by a first color filter island 101 and a laminated structure including the second color filter island 502 and the third color filter island 503.

Optionally, the laminated structure including the second color filter island 502 and the third color filter island 503 is utilized as a post spacer for maintaining a spacing between the touch substrate and the array substrate when they are assembled into a cell. The laminated structure is in contact with the array substrate in the assembled cell. By having this design, a post spacer layer may be formed as a part of one or more color filter layers in the touch display panel, i.e., fabricated in a same process, in a same layer, and using a same material as one or more color filter layers in the touch substrate. This process further simplifies the fabricating process. The thickness of the post spacer may be adjusted by either having a single layer color filter layer as the post spacer, or having a laminated structure having two color filter layers as the post spacer.

In another aspect, the present disclosure further provides a method of fabricating a touch substrate. In some embodiments, the method includes forming a touch electrode layer on a base substrate, the step of forming the touch electrode layer includes forming a plurality of columns of first touch electrodes, a plurality of rows of second touch electrodes, and a plurality of columns of electrode bridges in a same layer using a same electrode material; and forming a black matrix layer on the base substrate. The plurality of columns of first touch electrodes are formed to be insulated from the plurality of rows of second touch electrodes, and cross over the plurality of rows of second touch electrodes forming a plurality of intersections. Two adjacent first touch electrodes along a column direction are formed to be electrically connected at each intersection through an electrode bridge. Second touch electrodes in each row are formed to be spaced apart from each other along a row direction. Two adjacent second touch electrodes along the row direction are formed to be electrically connected at each intersection through the black matrix layer.

Figure 7A:
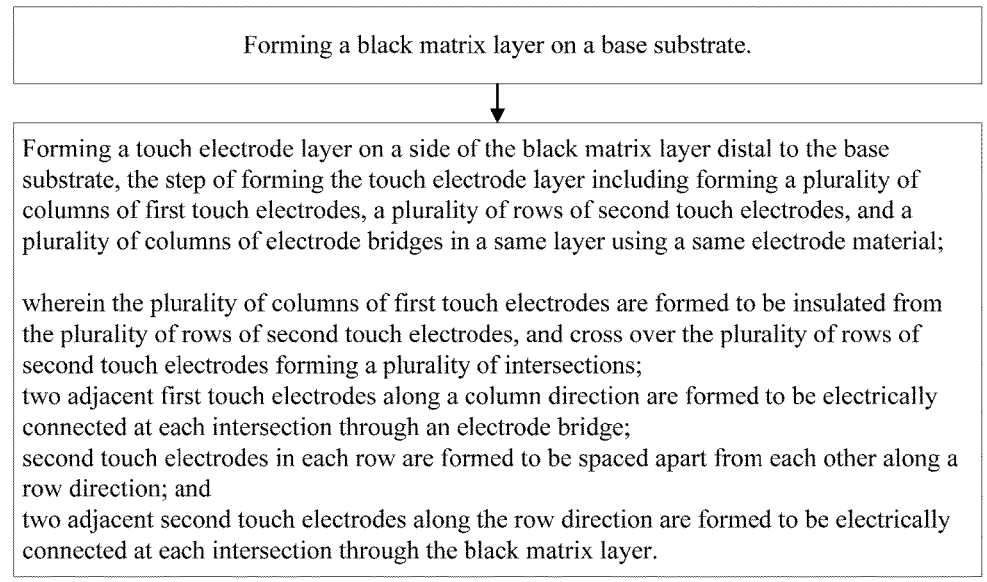
FIG. 7A is a flow chart illustrating a method of fabricating a touch substrate in some embodiments according to the present disclosure.

FIG. 7A is a flow chart illustrating a method of fabricating a touch substrate in some embodiments according to the present disclosure. Referring to FIG. 7A, the method in some embodiments includes forming a black matrix layer on a base substrate; and forming a touch electrode layer on a side of the black matrix layer distal to the base substrate. The step of forming the touch electrode layer includes forming a plurality of columns of first touch electrodes, a plurality of rows of second touch electrodes, and a plurality of columns of electrode bridges in a same layer using a same electrode material. The plurality of columns of first touch electrodes are formed to be insulated from the plurality of rows of second touch electrodes, and cross over the plurality of rows of second touch electrodes forming a plurality of intersections. Two adjacent first touch electrodes along a column direction are formed to be electrically connected at each intersection through an electrode bridge. Second touch electrodes in each row are formed to be spaced apart from each other along a row direction. Two adjacent second touch electrodes along the row direction are formed to be electrically connected at each intersection through the black matrix layer.

The black matrix layer is formed to electrically connect adjacent second touch electrodes along the row direction, but does not electrically connects a first touch electrode and a second touch electrode.

In some embodiments, the present method further includes forming an insulation layer including a plurality of insulating blocks, the plurality of columns of first touch electrodes are insulated from the plurality of rows of second touch electrodes at the plurality of intersections by the plurality of insulating blocks. FIG. 8 is a diagram illustrating the structure of a touch substrate in some embodiments according to the present disclosure. Referring to FIG. 8, in some embodiments, the method includes first forming a black matrix layer 40 on a base substrate, forming a plurality of insulating blocks 50 at the plurality of intersections, and subsequently forming the touch electrode layer having a plurality of columns of first touch electrodes, a plurality of rows of second touch electrodes, and a plurality of columns of electrode bridges in a same layer using a same electrode material. Specifically, the plurality of electrode bridges are formed on a side of the plurality of insulating blocks 50 distal to the base substrate.

FIG. 7B is a flow chart illustrating a method of fabricating a touch substrate in some embodiments according to the present disclosure. Referring to FIG. 7B, the method in some embodiments includes forming a touch electrode layer on a base substrate, and forming a black matrix layer on a side of the touch electrode layer distal to the base substrate. The step of forming the touch electrode layer includes forming a plurality of columns of first touch electrodes, a plurality of rows of second touch electrodes, and a plurality of columns of electrode bridges in a same layer using a same electrode material. The black matrix layer is formed so that two adjacent second touch electrodes along the row direction are formed to be electrically connected at each intersection through the black matrix layer. The plurality of columns of first touch electrodes are formed to be insulated from the plurality of rows of second touch electrodes, and cross over the plurality of rows of second touch electrodes forming a plurality of intersections. Two adjacent first touch electrodes along a column direction are formed to be electrically connected at each intersection through an electrode bridge. Second touch electrodes in each row are formed to be spaced apart from each other along a row direction.

The black matrix layer is formed to electrically connect adjacent second touch electrodes along the row direction, but does not electrically connects a first touch electrode and a second touch electrode.

In some embodiments, the present method further includes forming an insulation layer including a plurality of insulating blocks, the plurality of columns of first touch electrodes are insulated from the plurality of rows of second touch electrodes at the plurality of intersections by the plurality of insulating blocks. In some embodiments, the method includes first forming a touch electrode layer having a plurality of columns of first touch electrodes, a plurality of rows of second touch electrodes, and a plurality of columns of electrode bridges in a same layer using a same electrode material, then forming a plurality of insulating blocks at the plurality of intersections, and subsequently forming a black matrix layer on the base substrate, e.g., on a side of the insulating layer distal to the base substrate.

In the present method, the black matrix layer and the touch electrode layer are formed so that the second touch electrodes along the row direction are electrically connected by the black matrix layer, obviating the need for an insulating layer and an electrode bridge layer on top of the insulating layer for connecting the second touch electrodes. The touch electrode layer in a touch substrate fabricated by the present method may be formed using a single mask plate. The touch layer, the black matrix layer, and a color filter layer in the touch substrate fabricated by the present method may be formed using only three mask plates. As compared to the conventional method, a touch substrate may be fabricated using a much simplified process and lower manufacturing costs.

Referring to FIG. 3, the black matrix layer in some embodiments may be formed to include a plurality of columns of first black matrix blocks 401 corresponding to the plurality of first touch electrode 101, a plurality of rows of second black matrix blocks 402 corresponding to the plurality of second touch electrodes 201, and a plurality of rows of black matrix bridges 403 in a same layer and made of a same black matrix material. Two adjacent second black matrix blocks 201 along the row direction are formed to be electrically connected at each intersection IS through a black matrix bridge 403. Two adjacent first black matrix blocks 401 along the column direction are formed to be spaced apart from each other and are insulated from each other at each intersection IS. The plurality of columns of first black matrix blocks 401 are formed to be insulated from the plurality of rows of second black matrix blocks 402. Second black matrix blocks 402 and black matrix bridges 403 in each row are formed to have an integral structure. Two adjacent second touch electrodes 201 along the row direction are formed to be electrically connected at each intersection IS through the integral structure, e.g., a black matrix bridge 403.

The first black matrix block 401 and the black matrix block 402 may be formed to have any appropriate shapes and dimensions. Optionally, the first black matrix block 401 is formed to have a shape and a dimension corresponding to the first touch electrode 101. Optionally, the second black matrix block 402 is formed to have a shape and a dimension corresponding to the second touch electrode 201.

In the present method, any two adjacent first black matrix blocks 401 along the column direction are formed to be spaced apart and insulated from each other at each intersection IS, all first black matrix blocks 401 are formed to be spaced apart and insulated from all second black matrix blocks 402, and all first black matrix blocks 401 are formed to be spaced apart and insulated from each other. As a result, first touch electrodes 101 are insulated from second touch electrodes 201, e.g., not electrically connected through the black matrix layer. On the other hand, adjacent second touch electrodes Mon the row direction are electrically connected at each intersection through a black matrix bridge, thus adjacent second touch electrodes along the row direction are electrically connected through the black matrix layer, e.g., through a black matrix bridge.

Various black matrix materials and various appropriate fabricating methods may be used for making the touch electrode layer. For example, a black matrix material may be deposited on the substrate by a plasma-enhanced chemical vapor deposition (PECVD) process. Examples of black matrix materials suitable for making the black matrix layer include, but are not limited to, a conductive black metal, a conductive black metal oxide, or a conductive metal with a blackened surface. Examples of conductive black metals include, but are not limited to, manganese steel and copper. Examples of conductive black metal oxides include, but are not limited to, iron (II, III) oxide ($Fe_3O_4$), and ferric oxide ($Fe_2O_3$). Examples of conductive metals with a blackened surface include, but are not limited to, copper with a blackened surface, zinc with a blackened surface, and aluminum with a blackened surface.

In some embodiments, the method further includes forming a first color filter layer; the first color filter layer is formed so that the plurality of columns of first touch electrodes are insulated from the plurality of rows of second touch electrodes at the plurality of intersections by the first color filter layer. Optionally, the step of forming the first color filter layer includes forming a plurality of first color filter blocks corresponding to a plurality of subpixel of first color; and forming a plurality of first color filter islands corresponding to the plurality of intersections. The plurality of first color filter blocks and the plurality of first color filter islands are formed in a same layer using a same electrode material. The plurality of first color filter islands are formed so that a first touch electrode and a second touch electrodes at each intersection are insulated by a corresponding first color filter island.

In some embodiments, the method further includes forming a second color filter layer. Optionally, the step of forming the second color filter layer includes forming a plurality of second color filter blocks corresponding to a plurality of subpixel of second color; and forming a plurality of second color filter islands corresponding to the plurality of intersections. The plurality of second color filter blocks and the plurality of second color filter islands are formed in a same layer using a same electrode material. Optionally, the step of forming the first color filter and the step of forming the second color filter are performed so that a first color filter island and a second color filter island at each intersection form a laminated structure, the laminated structure at each intersection is formed to be sandwiched by an electrode bridge and a black matrix bridge, and the electrode bridge and the black matrix bridge at each intersection are insulated by the laminated structure. Optionally, the step of forming the first color filter and the step of forming the second color filter are performed so that an electrode bridge at each intersection is sandwiched by a first color filter island and a second color filter island.

In some embodiments, the method further includes forming a third color filter layer. Optionally, the step of forming the third color filter layer includes forming a plurality of third color filter blocks corresponding to a plurality of subpixel of third color, and forming a plurality of third color filter islands corresponding to the plurality of intersections. The plurality of third color filter blocks and the plurality of third color filter islands are formed in a same layer using a same electrode material. Optionally, the step of forming the first color filter, the step of forming the second color filter, and the step of forming the third color filter are performed so that a first color filter island, a second color filter and a third color filter island at each intersection form a laminated structure, the laminated structure at each intersection is formed to be sandwiched by an electrode bridge and a black matrix bridge, and the electrode bridge and the black matrix bridge at each intersection are insulated by the laminated structure. Optionally, the step of forming the first color filter, the step of forming the second color filter, and the step of forming the third color filter are performed so that an electrode bridge at each intersection is sandwiched by a first color filter island and a laminated structure comprising a second color filter island and a third color filter island.

In some embodiments, the method includes forming a first color filter layer having a plurality of first color filter blocks corresponding to a plurality of subpixel of first color and a plurality of first color filter islands corresponding to the plurality of intersections; forming a second color filter layer; and forming a third color filter layer.

In some embodiments, the method includes forming a first color filter layer having a plurality of first color filter blocks corresponding to a plurality of subpixel of first color, forming a second color filter layer having a plurality of second color filter blocks corresponding to a plurality of subpixel of second color, forming a third color filter layer having a plurality of third color filter blocks corresponding to a plurality of subpixel of third color, at least one of the first color filter layer, the second color filter layer, and the third color filter layer further is formed to include a plurality of color filter islands corresponding to the plurality of intersections.

Optionally, the plurality of intersections are formed at positions corresponding to a plurality of thin film transistors in a plurality of subpixels. This design further minimizes the adverse effect, if any, of the color filter islands at the intersections on display quality.

Referring to FIG. 4B and FIG. 4C, the method in some embodiments includes forming a first color filter island 501 at each intersection (but does not include forming a second color filter island or forming a third color filter island). An electrode bridge 301 and a black matrix bridge 403 at each intersection are insulated by the corresponding first color filter island 501. Referring to FIG. 4D, the method in some embodiments includes forming a first color filter island 501 and forming a second color filter island 502 at each intersection. The first color filter island 501 and the second color filter island 502 at each intersection form a laminated structure LS, which is an insulating island. An electrode bridge 301 and a black matrix bridge 403 at each intersection are insulated by the corresponding laminated structure LS. Referring to FIG. 4E, the method in some embodiments includes forming a first color filter island 501, forming a second color filter island 502, and forming a third color filter island 503 at each intersection. The first color filter island 501, the second color filter island 502, and the third color filter island 503 at each intersection form a laminated structure LS, which is an insulating island. An electrode bridge 301 and a black matrix bridge 403 at each intersection are insulated by the corresponding laminated structure LS.

According to the present method, the insulating island insulating first touch electrode (i.e., an electrode bridge associated therewith) from second touch electrode (i.e., a black matrix bridge associated therewith) may be formed as a part of one or more color filter layers in the touch substrate, i.e., fabricated in a same process, in a same layer, and using a same material as one or more color filter layers in the touch substrate. As such, the touch layer, the black matrix layer, and a color filter layer in a touch substrate fabricated by the present method may be formed using only three mask plates. As compared to the conventional method, the touch substrate may be fabricated using a much simplified process and lower manufacturing costs.

Referring to FIG. 5A and FIG. 5B, the method in some embodiments includes forming a first color filter island 501 and forming a second color filter island 502 at each intersection. An electrode bridge 301 and a black matrix bridge 403 at each intersection are insulated by the corresponding first color filter island 501. The second color filter island 502 is formed on a side of the electrode bridge 301 distal to the black matrix bridge 403, i.e., the electrode bridge 301 at each intersection is formed to be sandwiched by a first color filter island 501 and a second color filter island 502. Optionally, the second color filter island 502 is utilized as a post spacer for maintaining a spacing between the touch substrate and the array substrate when they are assembled into a cell. The second color filter island is in contact with the array substrate in the assembled cell. By having this design, a post spacer layer may be formed as a past of one or more color filter layers in the touch substrate, i.e., fabricated in a same process, in a same layer, and using a same material as one or more color filter layers in the touch substrate. This process further simplifies the fabricating process.

Referring to FIG. 5C and FIG. 5D, the method in some embodiments includes forming a first color filter island 501, forming a second color filter island 502, and forming a third color filter island 503 at each intersection. An electrode bridge 301 and a black matrix bridge 403 at each intersection are insulated by the corresponding first color filter island 501. The second color filter island 502 and the third color filter island 503 are formed on a side of the electrode bridge 101 distal to the black matrix bridge 403, i.e., the electrode bridge 301 at each intersection is formed to be sandwiched by a first color filter island 101 and a laminated structure including the second color filter island 502 and the third color filter island 503. Optionally, the laminated structure including the second color filter island 502 and the third color filter island 503 is utilized as a post spacer for maintaining a spacing between the touch substrate and the array substrate when they are assembled into a cell. The laminated structure is in contact with the array substrate in the assembled cell. By having this design, a post spacer layer may be formed as a part of one or more color filter layers in the touch substrate, i.e., fabricated in a same process, in a same layer, and using a same material as one or more color filter layers in the touch substrate. This process further simplifies the fabricating process. The thickness of the post spacer may be adjusted by either having a single layer color filter layer as the post spacer, or having a laminated structure having two color filter layers as the post spacer.

In another aspect, the present disclosure provides a method of fabricating a touch display panel, including fabricating a touch substrate according to a method described herein, providing an array substrate, and assembling the array substrate and the touch substrate in a cell.

In some embodiments, the method includes fabricating a touch substrate according to a method described herein, providing an array substrate, and assembling the array substrate and the touch substrate in a cell. In some embodiments, the step of forming the first color filter layer includes forming a plurality of first color filter blocks corresponding to a plurality of subpixel of first color and forming a plurality of first color filter islands corresponding to the plurality of intersections; the step of forming the second color filter layer includes forming a plurality of second color filter blocks corresponding to a plurality of subpixel of second color and forming a plurality of second color filter islands corresponding to the plurality of intersections. The plurality of first color filter blocks and the plurality of first color filter islands are formed in a same layer using a same electrode material. The plurality of first color filter islands are formed so that a first touch electrode and a second touch electrodes at each intersection are insulated by a corresponding first color filter island. The plurality of second color filter blocks and the plurality of second color filter islands are formed in a same layer using a same electrode material. The step of forming the first color filter and the step of forming the second color filter are performed so that an electrode bridge at each intersection is sandwiched by a first color filter island and a second color filter island. Optionally, the plurality of second color filter islands are formed to be in contact with the array substrate and configured to maintain a spacing between the touch substrate and the array substrate.

in some embodiments, the method includes fabricating a touch substrate according to a method described herein, providing an array substrate, and assembling the array substrate and the touch substrate in a cell. In some embodiments, the step of forming the first color filter layer includes forming a plurality of first color filter blocks corresponding to a plurality of subpixel of first color and forming a plurality of first color filter islands corresponding to the plurality of intersections; the step of forming the second color filter layer includes forming a plurality of second color filter blocks corresponding to a plurality of subpixel of second color and forming a plurality of second color filter islands corresponding to the plurality of intersections; and the step of forming the third color filter layer includes forming a plurality of third color filter blocks corresponding to a plurality of subpixel of third color and forming a plurality of third color filter islands corresponding to the plurality of intersections. The plurality of first color filter blocks and the plurality of first color filter islands are formed in a same layer using a same electrode material. The plurality of first color filter islands are formed so that a first touch electrode and a second touch electrodes at each intersection are insulated by a corresponding first color filter island. The plurality of second color filter blocks and the plurality of second color filter islands are formed in a same layer using a same electrode material. The plurality of third color filter blocks and the plurality of third color filter islands are formed in a same layer using a same electrode material. The step of forming the first color filter, the step of forming the second color filter, and the step of forming the third color filter are performed so that an electrode bridge at each intersection is sandwiched by a first color filter island and a laminated structure comprising a second color filter island and a third color filter island. Optionally, a plurality of laminated structures are formed to be in contact with the array substrate and configured to maintain a spacing between the touch substrate and the array substrate, each of the plurality of laminated structures comprises a second color filter island and a third color filter island at each intersection.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate, comprising:
a base substrate;
a touch electrode layer on a base substrate comprising a plurality of columns of first touch electrodes, a plurality of rows of second touch electrodes, and a plurality of columns of electrode bridges in a same layer and made of a same electrode material;
a black matrix layer on the base substrate;
a first color filter layer; and
a second color filter layer;
wherein the plurality of columns of first touch electrodes are insulated from the plurality of rows of second touch electrodes, and cross over the plurality of rows of second touch electrodes forming a plurality of intersections;
a plurality of first touch electrode in each column are electrically connected by a plurality of electrode bridges; and
a plurality of second touch electrode in each row are electrically connected by the black matrix layer;
the plurality of columns of first touch electrodes are insulated from the plurality of rows of second touch electrodes at the plurality of intersections by the first color filter layer;
the first color filter layer comprises a plurality of first color filter blocks corresponding to a plurality of subpixel of first color, and a plurality of first color filter islands corresponding to the plurality of intersections;
the plurality of first color filter blocks and the plurality of first color filter islands are in a same layer and made of a same insulating color filter material; and
an electrode bridge and a black matrix bridge at each intersection are insulated by a corresponding first color filter island;
the second color filter layer comprises a plurality of second color filter blocks corresponding to a plurality of subpixel of second color, and a plurality of second color filter islands corresponding to the plurality of intersections; and
the plurality of second color filter blocks and the plurality of second color filter islands are in a same layer and made of a same insulating color filter material.

2. The touch substrate of claim 1, wherein the black matrix layer comprises a plurality of columns of first black matrix blocks, a plurality of rows of second black matrix blocks, and a plurality of rows of black matrix bridges in a same layer and made of a same black matrix material;
two adjacent second black matrix blocks along the row direction are electrically connected at each intersection through a black matrix bridge;
two adjacent first black matrix blocks along the column direction are insulated from each other at each intersection;
the plurality of columns of first black matrix blocks are insulated from the plurality of rows of second black matrix blocks; and
two adjacent second touch electrodes along the row direction are electrically connected at each intersection through a black matrix bridge.

3. The touch substrate of claim 2, wherein first touch electrodes and electrode bridges in each column are of an integral structure; and
second black matrix blocks and black matrix bridges in each row are of an integral structure.

4. The touch substrate of claim 1, wherein a laminated structure comprising a first color filter island and a second color filter island at each intersection is sandwiched by an electrode bridge and a black matrix bridge; the electrode bridge and the black matrix bridge at each intersection are insulated by the laminated structure.

5. The touch substrate of claim 1, wherein an electrode bridge at each intersection is sandwiched by a first color filter island and a second color filter island.

6. The touch substrate of claim 1, further comprising a third color filter layer comprising a plurality of third color filter blocks corresponding to a plurality of subpixel of third color; and
a plurality of third color filter islands corresponding to the plurality of intersections;
wherein the plurality of third color filter blocks and the plurality of third color filter islands are in a same layer and made of a same insulating color filter material.

7. The touch substrate of claim 6, wherein a laminated structure comprising a first color filter island, a second color filter island, and a third color filter island at each intersection is sandwiched by an electrode bridge and a black matrix bridge; the electrode bridge and the black matrix bridge at each intersection are insulated by the laminated structure.

8. The touch substrate of claim 6, wherein an electrode bridge at each intersection is sandwiched by a first color filter island and a laminated structure comprising a second color filter island and a third color filter island.

9. The touch substrate of claim 1, wherein the black matrix layer is made of a conductive black metal, a conductive black metal oxide, or a conductive metal with a blackened surface.

10. The touch substrate of claim 1, the touch electrode layer is on a side of the black matrix layer distal to the base substrate.

11. The touch substrate of claim 1, the black matrix layer is on a side of the touch electrode layer distal to the base substrate.

12. A touch display panel comprising a touch substrate of claim 1 and an array substrate facing the touch substrate.

13. A touch display panel comprising a touch substrate of claim 5 and an array substrate facing the touch substrate, wherein the plurality of second color filter islands are in contact with the array substrate and configured to maintain a spacing between the touch substrate and the array substrate.

14. A touch display panel comprising a touch substrate of claim 8 and an array substrate facing the touch substrate, wherein a plurality of laminated structures is in contact with the array substrate and configured to maintain a spacing between the touch substrate and the array substrate, each of the plurality of laminated structures comprises a second color filter island and a third color filter island at each intersection.

15. A method of fabricating a touch substrate, comprising:
forming a touch electrode layer on a base substrate, the step of forming the touch electrode layer comprising forming a plurality of columns of first touch electrodes, a plurality of rows of second touch electrodes, and a plurality of columns of electrode bridges in a same layer using a same electrode material;
forming a black matrix layer on the base substrate;
forming a first color filter layer; and
forming a second color filter layer;
wherein the plurality of columns of first touch electrodes are formed to be insulated from the plurality of rows of second touch electrodes, and cross over the plurality of rows of second touch electrodes forming a plurality of intersections;
a plurality of first touch electrode in each column are formed to be electrically connected by a plurality of electrode bridges; and
a plurality of second touch electrode in each row are formed to be electrically connected by the black matrix layer;
wherein the first color filter layer is formed so that the plurality of columns of first touch electrodes are insulated from the plurality of rows of second touch electrodes at the plurality of intersections by the first color filter layer,
wherein forming the first color filter layer comprises forming a plurality of first color filter blocks corresponding to a plurality of subpixel of first color, and forming a plurality of first color filter islands corresponding to the plurality of intersections;
the plurality of first color filter blocks and the plurality of first color filter islands are formed in a same layer using a same electrode material; and
the plurality of first color filter islands are formed so that a first touch electrode and a second touch electrodes at each intersection are insulated by a corresponding first color filter island;
wherein forming the second color filter layer comprises forming a plurality of second color filter blocks corresponding to a plurality of subpixel of second color, and forming a plurality of second color filter islands corresponding to the plurality of intersections; and
the plurality of second color filter blocks and the plurality of second color filter islands are formed in a same layer using a same electrode material.

16. The method of claim 15, wherein the step of forming the black matrix layer comprises forming a plurality of columns of first black matrix blocks, a plurality of rows of second black matrix blocks, and a plurality of rows of black matrix bridges in a same layer using a same black matrix material;
wherein two adjacent second black matrix blocks along the row direction are formed to be electrically connected at each intersection through a black matrix bridge;
two adjacent first black matrix blocks along the column direction are formed to be insulated from each other at each intersection;
the plurality of columns of first black matrix blocks are formed to be insulated from the plurality of rows of second black matrix blocks; and
two adjacent second touch electrodes along the row direction are formed to be electrically connected at each intersection through a black matrix bridge.

* * * * *